(12) United States Patent
Gaikwad et al.

(10) Patent No.: US 12,536,299 B2
(45) Date of Patent: Jan. 27, 2026

(54) TRUST SCORING FRAMEWORK FOR ZERO-TRUST COMPUTING ENVIRONMENTS

(71) Applicant: Dell Products, L.P., Round Rock, TX (US)

(72) Inventors: Deepak Gaikwad, Natick, MA (US); Judith A. Furlong, Natick, MA (US); Raj Suryavanshi, Leander, TX (US); Biraj Silwal, Pflugerville, TX (US); Berke Belge, Westford, MA (US); Chenhao Huang, Acton, MA (US); Sarthak Madrecha, Milpitas, CA (US)

(73) Assignee: Dell Products L.P., Round Rock, TX (US)

( * ) Notice: Subject to any disclaimer, the term of this patent is extended or adjusted under 35 U.S.C. 154(b) by 260 days.

(21) Appl. No.: 18/363,159

(22) Filed: Aug. 1, 2023

(65) Prior Publication Data

US 2025/0045414 A1 Feb. 6, 2025

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC .................................................... G06F 21/577
See application file for complete search history.

(56) References Cited

U.S. PATENT DOCUMENTS

| | | | |
|---|---|---|---|
| 2013/0239167 A1* | 9/2013 | Sreenivas | G06F 21/577 726/1 |
| 2017/0111445 A1* | 4/2017 | Kunde | H04L 67/10 |

\* cited by examiner

*Primary Examiner* — William J. Goodchild
*Assistant Examiner* — Thong P Truong
(74) *Attorney, Agent, or Firm* — Fogarty LLP

(57) ABSTRACT

Methods and systems are included for evaluating trust in resources of a zero-trust computing environment. A request is received from a user for access to a resource of the zero-trust environment. A trust score is calculated for the resource based on: users requesting access to the resource, hardware components used to request access to the resource, software applications used to request access to the resource, networks used to request access to the resource and data exposed by providing the requested access to the resource. The request from the user is evaluated based on policies of the zero-trust environment that govern access to the resource, where policies grant or deny access to the resource based in part on the calculated trust score of the resource.

18 Claims, 8 Drawing Sheets

TRUST SCORING FRAMEWORK FOR ZERO-TRUST COMPUTING ENVIRONMENTS

FIELD

The present disclosure relates generally to Information Handling Systems (IHSs), and relates more particularly to the operation of IHSs in zero-trust computing environments.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that may be stacked and installed within racks. Each server IHS within a data center may support a wide variety of possible hardware and software configurations. For instance, a server IHS may be manufactured accordingly to customized hardware and software configurations requested by a customer. In addition, upon manufacture and delivery to a customer, a received server may be provisioned for deployment according to the particular requirements of that customer.

The IHS resource of a data center may be used to implement various types of computing environments. For instance, data center resource may implement a zero-trust computing environment in which protected resources of the environment, referred to herein as zero-trust resources, are accessible only to authenticated requestors, with every request being validated (i.e., "never trust, always verify"). Access to a zero-trust resource may be governed by policies of the zero-trust environment, where such policies may be dynamically updated to account for changes in the risk profile of the zero-trust environment and/or of zero-trust resources. Maintaining access to a zero-trust resource also requires continuous validation of the session providing access to the zero-trust resource.

SUMMARY

Embodiments include various methods and systems for evaluating trust in resources of a zero-trust computing environment. Embodiments may include: receiving a request from a first user for access to a first resource of the zero-trust computing environment; calculating a trust score for the first resource, where the trust score is calculated based on: users requesting access to the first resource, hardware components used to request access to the first resource, software applications used to request access to the first resource, networks used to request access to the first resource and data exposed by providing the requested access to the first resource; and evaluating the request from the first user based on one or more policies of the zero-trust computing environment that govern access to the first resource, where a first policy grants access to the first resource based in part on the calculated trust score of the first resource.

Some embodiments may include calculating a trust score of the zero-trust computing environment by summing the trust score of the first resource and a plurality of trust scores calculated for other resources of the zero-trust computing environment, wherein a second policy grants access to the resource based on the trust score of the zero-trust computing environment. Some embodiments may include calculating an identity tenant trust score for the first resource, wherein the identity tenant trust score is calculated based on users requesting access to the first resource, and wherein the identity tenant trust score is used to update the trust score for the first resource. Some embodiments may include calculating a hardware tenant trust score for the first resource, wherein the hardware tenant trust score is calculated based on hardware devices requesting access to the first resource, and wherein the hardware tenant trust score is used to update the trust score for the first resource. Some embodiments may include calculating a software tenant trust score for the first resource, wherein the software trust score is calculated based on software applications requesting access to the first resource, and wherein the software tenant trust score is used to update the trust score for the first resource. Some embodiments may include calculating a network tenant trust score for the first resource, wherein the network trust score is calculated based on networks used to request access to the first resource, and wherein the network tenant trust score is used to update the trust score for the first resource. Some embodiments may include calculating a data tenant trust score for the first resource, wherein the data tenant trust score is calculated based on data exposed by providing the requested access to the first resource, and wherein the data tenant trust score is used to update the trust score for the first resource. Some embodiments may include the first resource of the zero-trust environment comprises at least one of a hardware component, a software application and a data element. Some embodiments may include the identity tenant trust score for the first resource is adjusted upwards due to the users requesting access to the first resource comprising only administrative users. Some embodiments may include the identity tenant trust score for the first resource is adjusted downwards in relation to a number of denials for access to the first resource. Some embodiments may include the hardware tenant trust score for the first resource is adjusted upwards due to the hardware devices requesting access to the first resource comprising only administrative hardware. Some embodiments may include the hardware tenant trust score for the first resource is adjusted downwards due to the hardware device requesting access to the first resource comprising a portable hardware device. Some embodiments may include the software tenant trust score for the first resource is adjusted upwards due to the software applications requesting access to the first resource comprising only administrative software. Some embodiments may include software tenant trust score for the first resource is adjusted downwards due to the software applications requesting access to the first resource comprising web-based software.

Some embodiments may include the network tenant trust score for the first resource is adjusted upwards in relation to a number different networks being used to request access the first resource. Some embodiments may include the network tenant trust score for the first resource is adjusted downwards due to the networks being used to request access the first resource utilizing encrypted network communications. Some embodiments may include the data tenant trust score for the first resource is adjusted upwards based on data that is exposed by granting the requested access to the first resource.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
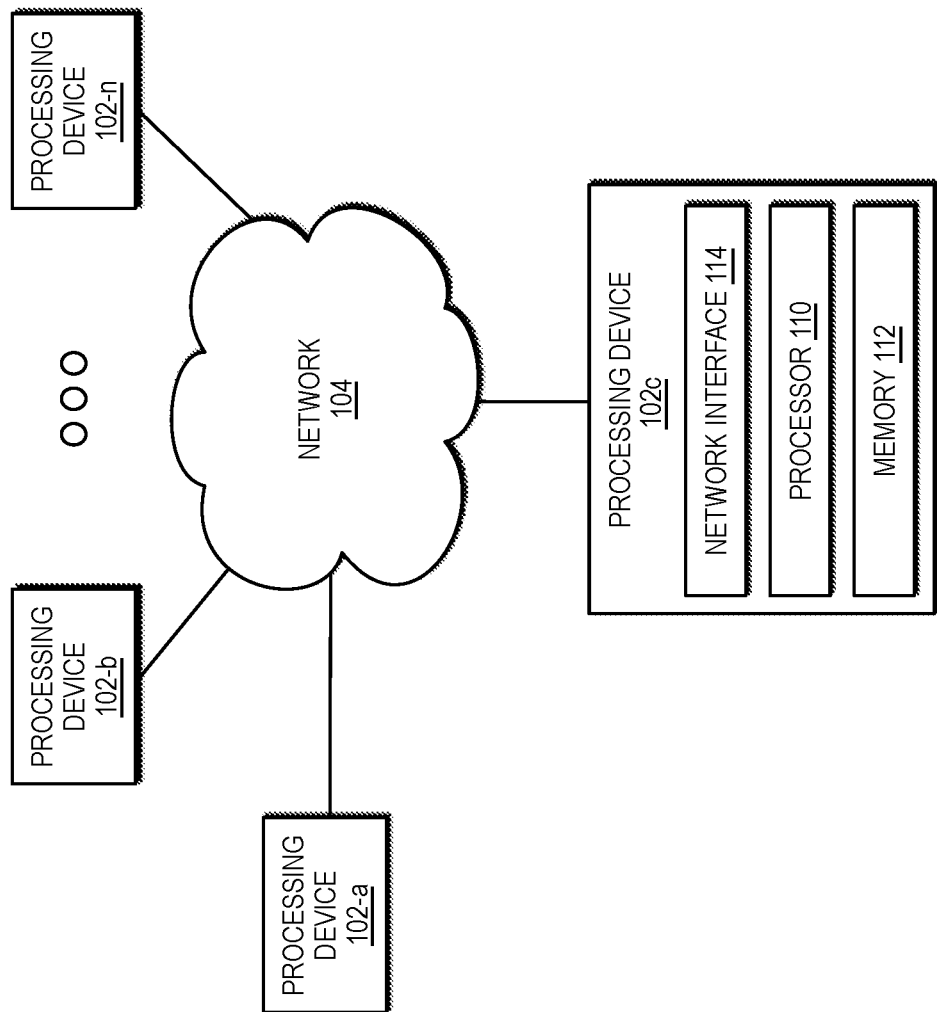
FIG. 1 is a diagram illustrating certain components of a chassis configured, according to some embodiments, to support the operation of zero-trust computing environments that utilize a trust scoring framework.

FIG. 1 shows a computer network (also referred to herein as an information processing system) 100 configured in accordance with an illustrative embodiment. The computer network 100 comprises one or more processing devices 102a-n that may implement a zero-trust computing environment utilizing a trust scoring framework. The processing devices 102a-n are coupled to a network 104, where the network 104 in this embodiment is assumed to represent a sub-network or other related portion of the larger computer network 100. Accordingly, elements 100 and 104 may both be referred to herein as examples of "networks," but the latter is assumed to be a component of the former in the context of the FIG. 1 embodiment. Also coupled to network 104 is an example trust scoring framework that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the processing devices 102a-n may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The processing devices 102a-n in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the example zero-trust computing environment are one or more input-output devices, which illustratively comprise keyboards, displays or other types of input-output devices in any combination. Such input-output devices can be used, for example, to support one or more user interfaces to zero-trust computing environment, as well as to support communication between the example zero-trust computing environment and other related systems and devices not explicitly shown. For example, a dashboard may be provided for a user to view a progression of the execution of the trust scoring framework of the zero-trust computing environment. One or more input-output devices may also be associated with any of the processing devices 102a-n.

Additionally, the example zero-trust computing environment in the FIG. 1 embodiment is assumed to be implemented using at least one processing device 102c. Each such processing device 102c generally comprises at least one processor 110 and an associated memory 112, and implements one or more functional modules for controlling certain features of a trust scoring framework used by the zero-trust computing environment. More particularly, the processing devices 102c in this embodiment can comprise a processor 110 coupled to a memory 112 and a network interface 114. The processor 110 illustratively comprises a microprocessor, a microcontroller, an application-specific integrated circuit (ASIC), a field-programmable gate array (FPGA) or other type of processing circuitry, as well as portions or combinations of such circuitry elements. The memory 112 illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface 114 allows the example processing devices 102*c* to communicate over the network 104 with other elements of the zero-trust computing environment, and processing devices 102*a-n* and illustratively comprises one or more conventional transceivers. An example zero-trust computing environment and trust scoring framework may be implemented at least in part in the form of software that is stored in memory 112 and executed by a processor 110, and may reside in any processing device 102*a-n*. The trust scoring framework may be a standalone plugin that may be included within a processing device processing devices 102*a-n*.

It is to be understood that the particular set of elements shown in FIG. 1 for example processing devices 102*c* involving the trust scoring framework is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the example processing devices 102*c* can be on and/or part of the same processing platform.

Figure 2:
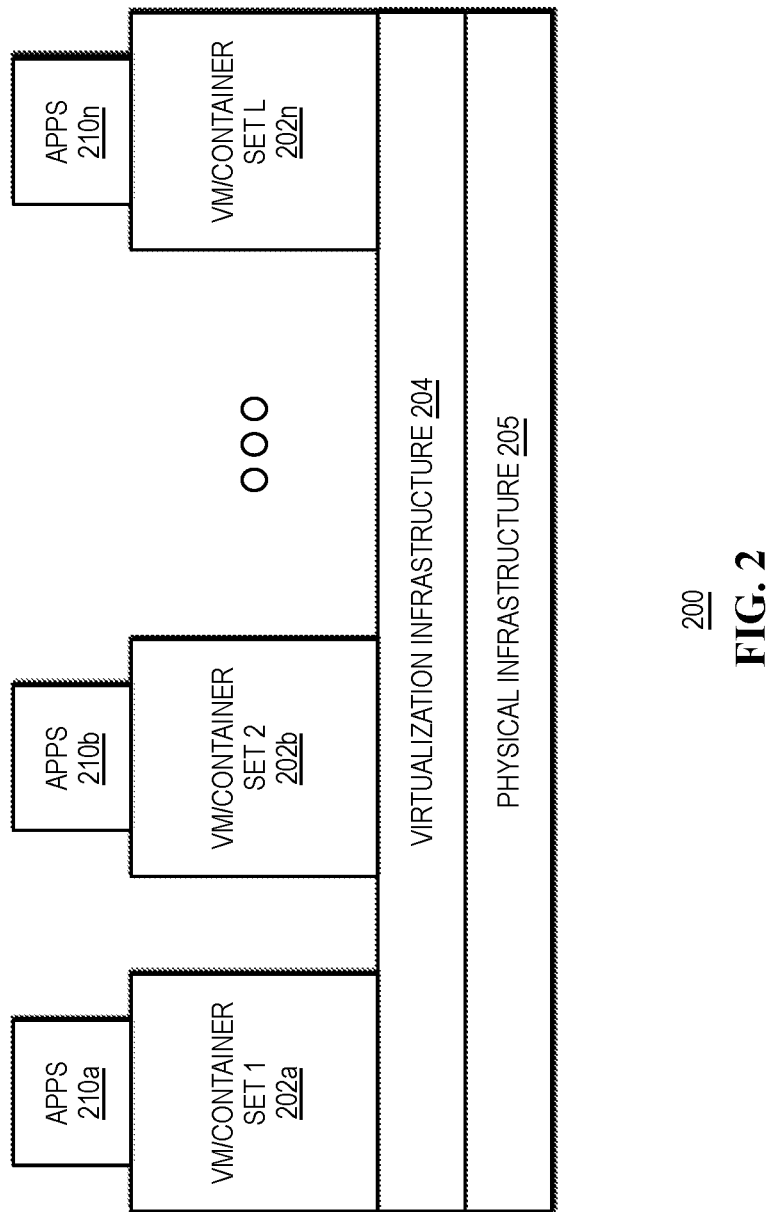
FIG. 2 is a diagram illustrating certain components of an IHS configured, according to some embodiments, to support the operation of zero-trust computing environments that utilize a trust scoring framework.

FIG. 2 is a diagram of an example system 200 in an illustrative embodiment used to implement a zero-trust computing environment. It is to be understood that this particular process is only an example, and additional or alternative processes can be carried out in other embodiments. Accordingly, the particular trust scoring framework and other functionality described in conjunction with the diagram of FIG. 2 are presented by way of illustrative example only, and should not be construed as limiting the scope of the disclosure in any way.

The described illustrative embodiments provide significant advantages relative to conventional approaches. For example, some embodiments are configured to provide other inventive advantages associated with the inventive details. It is to be appreciated that the particular advantages described herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the zero-trust computing environment can be implemented using one or more processing platforms 200. A given such processing platform 200 comprises at least one processing device comprising a processor coupled to a memory. The processor and memory in some embodiments comprise respective processor and memory elements of a virtual machine 202*a-n* or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform 200 used to implement at least a portion of a zero-trust computing environment comprises cloud infrastructure including virtual machines 202*a-n* implemented using a hypervisor 204 that runs on physical infrastructure 205. The cloud infrastructure further comprises sets of applications 210*a-n* running on respective ones of the virtual machines 202*a-n* under the control of the hypervisor 204. It is also possible to use multiple hypervisors 204 each providing a set of virtual machines 202*a-n* using at least one underlying physical machine 205. Different sets of virtual machines 202*a-n* provided by one or more hypervisors 204 may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment. As mentioned previously, cloud infrastructure as disclosed herein can include cloud-based systems. Virtual machines 202*a-n* provided in such systems can be used to implement at least portions of a zero-trust computing environment in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines 202*a-n* in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines 202*a-n* implemented using a hypervisor 204.

The cloud infrastructure 200 comprises a combination of physical and virtual processing resources that are utilized to implement at least a portion of the information processing system 100. The cloud infrastructure 200 comprises multiple virtual machines (VMs) and/or container sets 202*a-n* implemented using virtualization infrastructure 204. The virtualization infrastructure 204 runs on physical infrastructure 205, and illustratively comprises one or more hypervisors and/or operating system level virtualization infrastructure. The operating system level virtualization infrastructure illustratively comprises kernel control groups of a Linux operating system or other type of operating system.

The cloud infrastructure 200 further comprises sets of applications 210a-n running on respective ones of the VMs/container sets 202a-n under the control of the virtualization infrastructure 204. The VMs/container sets 202a-n comprise respective VMs, respective sets of one or more containers, or respective sets of one or more containers running in VMs. In some implementations of the FIG. 2 embodiment, the VMs/container sets 202a-n comprise respective VMs implemented using virtualization infrastructure 204 that comprises at least one hypervisor.

A hypervisor platform may be used to implement a hypervisor within the virtualization infrastructure 204, where the hypervisor platform has an associated virtual infrastructure management system. The underlying physical machines comprise one or more distributed processing platforms that include one or more storage systems.

In other implementations of the FIG. 2 embodiment, the VMs/container sets 202a-n comprise respective containers implemented using virtualization infrastructure 204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 200 shown in FIG. 2 may represent at least a portion of one processing platform. Another example of such a processing platform is processing platform 400 shown in FIG. 4.

The particular processing platform 200 shown in the figure is presented by way of example only, and the information processing system 200 may include additional or alternative processing platforms, as well as numerous distinct processing platforms in any combination, with each such platform comprising one or more computers, servers, storage devices or other processing devices. For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs. As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform. Also, numerous other arrangements of computers, servers, storage products or devices, or other components are possible in the information processing system 100. Such components can communicate with other elements of the information processing system 100 over any type of network or other communication media. For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

Figure 3:
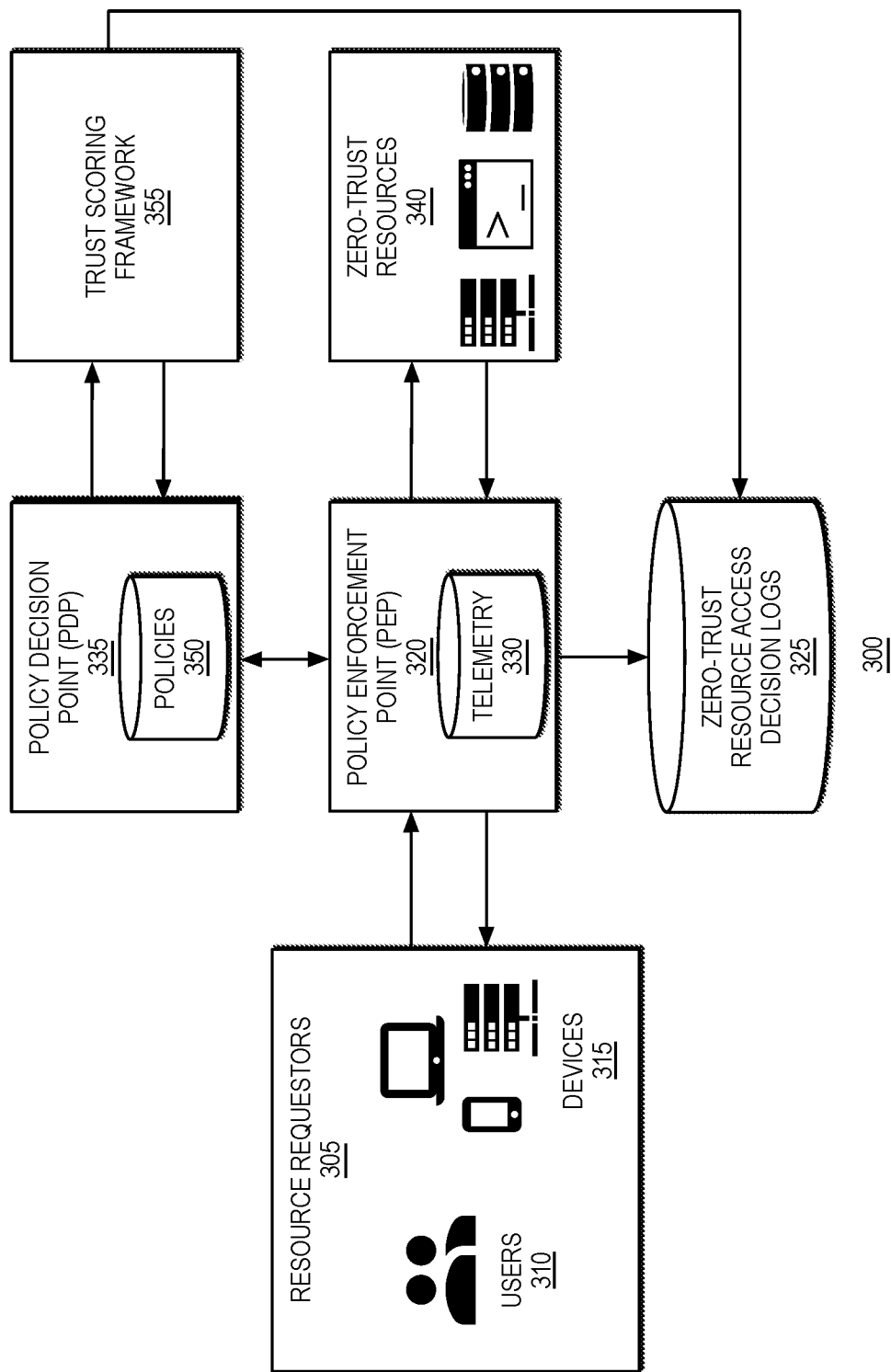
FIG. 3 is a diagram illustrating certain components of a zero-trust environment, according to some embodiments, that utilizes a trust scoring framework.

FIG. 3 is a diagram illustrating certain components of a zero-trust environment 300, according to some embodiments, that utilizes a trust scoring framework 355. As described above with regard to FIGS. 1 and 2, a variety of resources of a chassis 100 and/or an IHS 100 may be designated as zero-trust resources 340 within a zero-trust environment 300. A zero-trust environment 300 operates on the principle of continuous verification and strict access controls for hardware, software and data that have been designated as zero-trust resources 340. In the zero-trust environment 300, every user 310 (e.g., a human user or a process) and/or device 315 that is a zero-trust resource requestor 305 is always untrusted. The zero-trust environment 300 may utilize multiple layers of security controls, such as multifactor authentication, encryption, and network segmentation in implementing policies 350 that dictate access to zero-trust resources 340. Each user 310 and/or device 315 is individually authenticated and authorized when requesting access to a zero-trust resource 340, such that access is granted strictly on a need-to-know basis. In this manner, a zero-trust environment 300 minimizes the attack surface that is presented by providing access to a zero-trust resource 340.

Through the use of policies 350 the operations of the trust scoring framework may be adapted to different environments. For instance, policies may be selected for use that implement strict security requirements for some or all of the zero-trust resources, or less restrictive policies may be selected for controlling access to other less critical resources. Embodiments may support various other capabilities for configuring the operation of the trust scoring framework, and in particular for adapting the trust scoring framework for operation in different environments. As described in additional detail below, a trust score may be calculated for a zero-trust resource based on one or more tenant scores that each represent distinct risk factors to which the resource has been subjected based on prior requests to access the resource. In embodiments, each of these tenant scores may be separately weighted in generating an aggregated score for the resource.

In addition, embodiments may support assignment of various other weights for use within the trust scoring framework, where such weights may be used to adjust the trust score for the zero-trust resource and/or may otherwise be used within the evaluation of polices that are applicable to the zero-trust resource. In embodiments, the values of such weights be selected automatically or manually in order to adapt the trust scoring framework to different environments. For instance, an administrator configuring the operation of the trust scoring framework within a highly secured environment the utilizes only strict security policies may select one or more such weights that result in increased trust score requirements for access to resources within that environment. Such selection of weights for use of the trust scoring framework within a highly secured environment may additionally or alternatively result in larger downward adjustments to trust scores in response to the evaluation of access requests and/or policy determinations, as described in additional detail below. Through such selection of weights, the trust scoring framework may be tuned for operation within environments with differing security postures.

In a zero-trust environment 300, a policy enforcement point (PEP) 320 serves as a gatekeeper that controls access to zero-trust resources 340 based on one or more applicable policies 350. The policy enforcement point 320 serves as a mediator between requestors 305, such as users 310 and devices 315, and the zero-trust resources 340. The policy enforcement point 320 may employ various security mechanisms to securely identify the user 310 or device 315 that is requesting access to a zero-trust resource 340 in order to ensure that only authorized and trusted entities are evaluated for access to the requested zero-trust resource 340, where this access is determined by a policy decision point 335 based on one or more applicable policies 350.

A policy decision point 335 is responsible for making access-control determinations for zero-trust resources 340, where such determinations are made based on the evaluation of policies 350 with contextual information as inputs. The policy decision point 335 implements the logic within a zero-trust environment 300 that determines whether requested access to a zero-trust resource 340 will be granted. The policy decision point 335 receives access requests from users 310 or devices 315, typically through the policy enforcement point 320. Through the evaluation of applicable policies, the policy decision point 335 determine whether the requested access should be granted or denied. The policy decision point 335 may dynamically assess the risk associated with each access attempt based on a variety of context information. The policy decision point 335 may incorporate data from various sources, including user directories, threat intelligence feeds, and security analytics platforms in evaluating a request for access to a zero-trust resource 340.

A policy decision point 335 may evaluate access requests based on policies 350 that may consider a variety of factors, where access to any of the zero-trust resources 340 may be governed by policies that have been selected and adapted specifically for the protection of a specific zero-trust resource 340. For instance, policy decisions by a policy decision point 335 may be based on the identity of the user 310/device 315, where the identity validations may be made using information such as usernames, passwords, or biometric data. For example, policies that govern access to a zero-trust resource 340, such as a compute sled 105a of the chassis 100 of FIG. 1, may require biometric authentication of the user 310 requesting the access. In another illustrative example, polices 350 evaluated by a policy decision point 335 may assess various security characteristics of the device 315 that is requesting the access, or from which the request is being issued by a user 310. For instance, the polices may evaluate characteristics of the requesting device 315 such as whether security protocols are supported by the requesting device, and thus whether the requesting device can successfully respond to challenges issued by the policy decision point 335.

In another illustrative example, polices 350 evaluated by a policy decision point 335 may assess location and network context information in making access determinations. For instance, polices 350 may consider the geographic location of the user 310/device 315, such as in restricting access to a zero-trust resource 340 to users 310 that are physically located at a restricted-access environment. Other policies 350 may consider network information such as whether the user's request for access is received from an untrusted network. In this manner, a variety of policies 350 may govern access to a zero-trust resource 340 through the evaluation of these policies by a policy decision point 335.

In embodiments, a policy decision point 335 may utilize a trust scoring framework 335 to assess and evaluate the security posture of a requested zero-trust resource and of the zero-trust environment 300 itself, where scores generated using the framework 335 may be utilized as inputs to policies 350 that govern access to the zero-trust resources 340. As described in additional detail with regard to FIGS. 3-6, the scoring framework 355 assesses an individual zero-trust resource 340 for contextual indications of trust and assigns the resource a trust score that may be calculated based on one or more tenant scores. In some embodiments, the tenant scores may be aligned with tenants of the zero-trust computing environment 300.

For example, in some embodiments, an identity tenant trust score for a zero-trust resource 340 may be based on the identities of the users 310 that have requested access to this particular resource over various time intervals, where an identity tenant is one of the tenants of the zero-trust computing environment 300. In another example, the trust score for a zero-trust resource 340 may be additionally or alternatively based on a hardware tenant trust score for the resource based on the hardware devices 315 that have requested access to this particular resource over various time intervals. In another example, the trust score for a zero-trust resource 340 may be additionally or alternatively based on a software tenant trust score for the resource based on the software applications or other processes that have requested access to this particular resource over various time intervals. In another example, the trust score for a zero-trust resource 340 may be additionally or alternatively based on a network tenant trust score that based on the networks being used to access the zero-trust resource 340. In another example, the trust score for a zero-trust resource 340 may be additionally or alternatively based on a data tenant trust score that is based on the data exposure resulting from providing access to the zero-trust resource 340. As described in additional detail below, the trust scoring framework 355 collects the data necessary to generate such tenant scores and utilizes these scores in generating a trust score for a zero-trust resource 340 and/or for the overall zero-trust computing environment 300.

In some embodiments, a policy decision point 335 may incorporate one or all of these scores generated by the trust scoring framework 355 into its policy 350 evaluations that are used to make access decisions for zero-trust resources 340. For instance, if a requested zero-trust resource 340 has been assigned a low trust score, applicable policies may dictate a rejection of the request by the policy decision point 335. In one scenario, a low trust score for a zero-trust resource 340 may be generated due to collected telemetry that indicates repeated requests to access this particular resource, where the requests have been denied based on the applicable policies of the zero-trust environment 300. Conversely, a high trust score for a zero-trust resource 340 may be generated due to collected telemetry that indicates only encrypted networks have been used to provide access to this zero-trust resource 340 over a recent time interval and/or all granted access to the zero-trust resource during the interval has been by administrative users. In some embodiments, the policy decision point 335 may be configured to place emphasis on certain tenants of the zero-trust computing environment 300 through the use of, or emphasis on, particular tenant scores, as configured by the trust scoring framework 355.

As described below, embodiments may collect such telemetry associated with requests for access to zero-trust resources 340, where such telemetry may then be used to calculate updated trust scores for these resources. Through the use of such trust scores, the polices 350 enforced a policy decision point 335 may be used to implement access restrictions that limit access to zero-trust resources 340 based on dynamically updated security posture information for the both the resource and the environment 300. Through the use of scores that reflect the security level of the zero-trust resources 340 and the zero-trust environment 300 itself, embodiments provide improved access control determinations that consider whether the resource being requested is secure, rather than making access determinations solely based on the identity of the requestor 305 of the resource.

Figure 4:
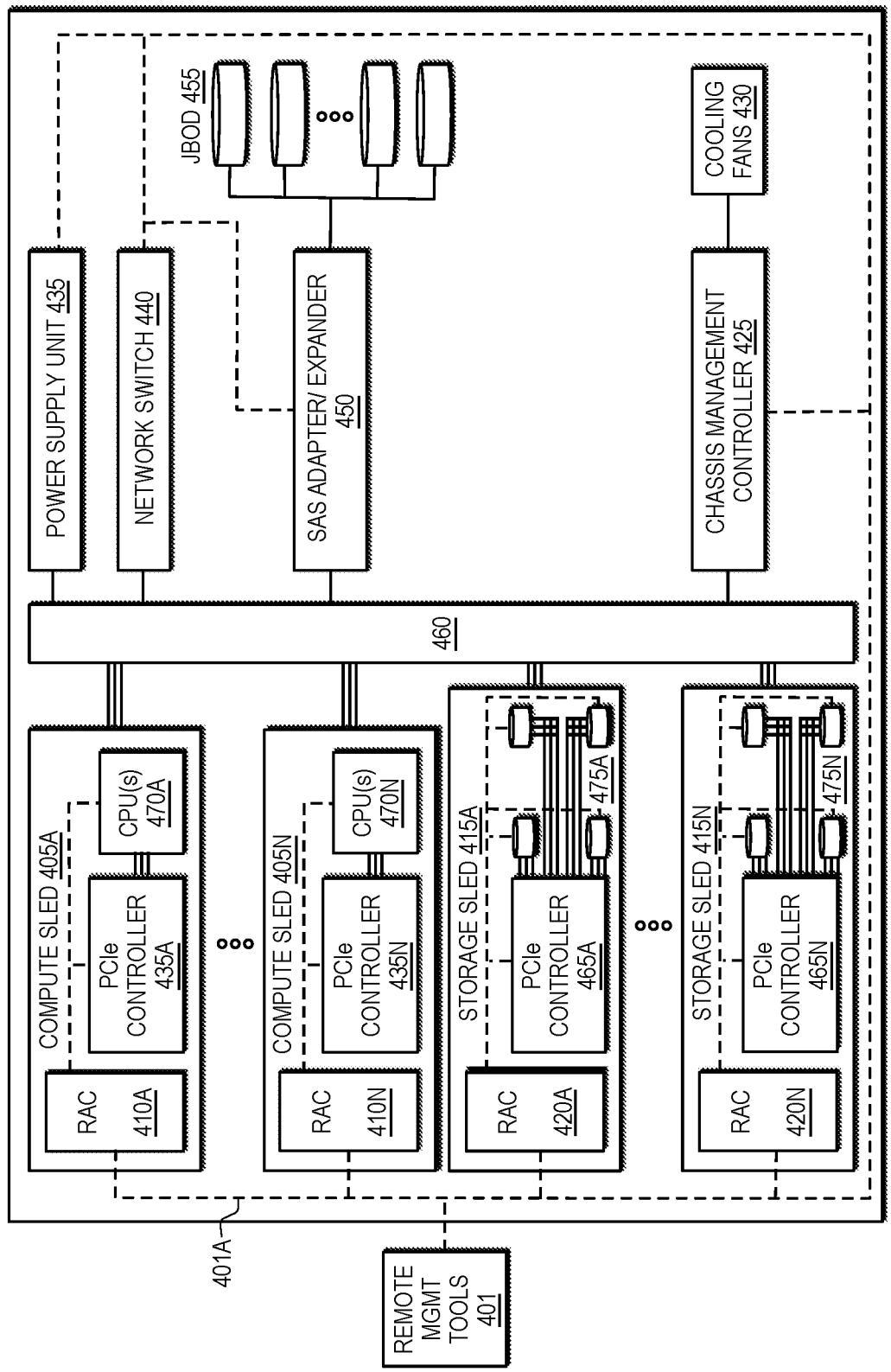
FIG. 4 is a diagram illustrating certain components of a chassis configured, according to some embodiments, to support the operation of zero-trust computing environments that utilize a trust scoring framework.

FIG. 4 is a block diagram illustrating certain components of a chassis 100 configured to support the operation of zero-trust computing environments that utilize a trust scoring framework. As described in additional detail below, embodiments may implement one or more zero-trust computing environments using some or all of the various chassis 400 resources described herein, such as through the use of removeable compute sled IHSs 405a-n and storage sled IHSs 415a-n that may be coupled to chassis 100 and that may be used to customize the computing and storage capabilities of chassis 100. Various hardware and software resources of chassis 400 may be components of one or more zero-trust computing environments that operate on the chassis.

Access to certain of these resources of chassis 400 may be subject to one or more polices of these zero-trust computing environments. These zero-trust resources of chassis 400 are thus protected through the application of polices that specify requirements that must be satisfied in order for a user or device to be granted access to a particular zero-trust resource. As described in additional detail below, embodiments support the evaluation of requests for access to zero-trust resources through the use of a scoring framework that characterizes the level of trust in individual zero-trust resources, as well as in the overall zero-trust environment. The trust scoring framework supported by embodiments characterizes behavioral and environmental indicators of trust for an individual zero-trust resource, where the indicators of trust may be derived from telemetry that may be collected, at least in part, by instrumented hardware and software of chassis 400.

Various hardware and software components of chassis 400 may be configured to support the collection and evaluation of data that is used in determining trust scores for individual zero-trust resources. These trust scores for the individual zero-trust resources may then be aggregated in order to provide a score that characterizes the trust in the overall zero-trust environment. When requests are received for access to a zero-trust resource, these trust scores for the requested resource and overall environment may be used through the application of policies in determining whether to grant access to the zero-trust resource.

Some embodiments may track each instance for which access to a zero-trust resource is either granted or denied. In tracking the request, embodiments may also collect telemetry describing access to the zero-trust resource by other users and/or devices. Embodiment may then utilize the collected information in order to update the trust scores for the resource and/or zero-trust environment. As users are granted or denied access to zero-trust resources, the level of trust in the resource and/or in the overall may change over time. For example, the level of trust in a hardware device may be impacted based on the identities and risk classifications of users that have been granted access to that device. In another illustrative example, the level of trust in a zero-trust resource may be impacted by the frequency at which access requests to that resource have been denied, thus indicating possible attempts to compromise the device. Through telemetry supported by chassis 400, embodiments may track such indications of changes in the level of trust in an individual zero-trust resources and/or in the overall zero-trust environment, thus supporting updates to trust scores that may be used within the zero-trust environment.

Embodiments of chassis 400 may include a wide variety of hardware configurations in which one or more IHS 405a-n, 415a-n (such as replaceable compute and storage sleds) are installed in chassis 400. Such variations in hardware configurations may result from chassis 400 being factory assembled to include components specified by a customer that has contracted for manufacture and delivery of chassis 400. Upon delivery and deployment of a chassis 400, the chassis 400 may be modified by replacing and/or adding various hardware components, in addition to replacement of the removeable IHSs 405a-n, 415a-n that are installed in the chassis. In addition, once the chassis 400 has been deployed, firmware and other software used by individual hardware components of the IHSs 405a-n, 415a-n, or by other hardware components of chassis 400, may be modified in order to update the operations that are supported by these hardware components. In some instances, such updates may be used to enable and disable features of an IHS and/or chassis that have been licensed for use by an owner or operator of the chassis 400, where the features that have been enabled and conditions for use of the enabled features may be set forth in a service agreement that is associated with the chassis 400. In some instances, such service agreements may specify the use of a zero-trust framework for controlling access to certain zero-trust resources, such as an agreement requiring zero-trust access to a proprietary FPGA or hardware accelerator that is installed in chassis 400. The service level agreement may also specify levels of security that are to be applied in implementing the zero-trust access to the zero-trust resource, in which case these trust levels specified in a service level agreement may be used to configure trust thresholds used in evaluation of the trust scores generated by embodiments.

Chassis 400 may include one or more bays that each receive an individual sled (that may be additionally or alternatively referred to as a tray, blade, and/or node) IHSs, such as compute sleds 405a-n and storage sleds 415a-n. Chassis 400 may support a variety of different numbers (e.g., 4, 8, 16, 32), sizes (e.g., single-width, double-width) and physical configurations of bays. Embodiments may include additional types of sleds that provide various storage, power, networking and/or processing capabilities. For instance, sleds installable in chassis 400 may be dedicated to providing power management or network switch functions. Sleds may be individually installed and removed from the chassis 400, thus allowing the computing and storage capabilities of a chassis to be reconfigured by swapping the sleds with different types of sleds, in some cases at runtime without disrupting the ongoing operations of the other sleds installed in the chassis 400.

In some embodiments, access to any or all of the sleds 405a-n, 415a-n installed in chassis 400 may be governed by the policies of a zero-trust environment, based on the sleds being designated as zero-trust resources. In such embodiments, policies may govern all access to these sleds 405a-n, 415a-n, where such policies may specify trust score levels required for any user or for a particular user to be granted access to a particular sled 405a-n, 415a-n. Separate from trust score requirements, such policies may also specify various other attributes of a zero-trust resource, and/or attributes of the zero-trust environment, that are to be evaluated in determining whether to provide access to a zero-trust resource.

In embodiments of the trust scoring framework, some of these attributes of the resource and/or environment may be categorized into trust tenants that are separately scored, where the scores for these individual trust tenants may then be combined to generate an trust score for a zero-trust resource. In some embodiments, the trust scoring framework may include an identity tenant. In a scenario where a sled 405a-n, 415a-n is a zero-trust resource, identity tenant trust score may be generated based on the identity of all users that are currently accessing that particular sled.

As described in additional detail below, in embodiments, sleds 405a-n, 415a-n may be instrumented to monitor and report the users that are currently accessing a respective sled, where such monitoring may refrain from identifying these users that are currently accessing the sled as specific individuals and may instead identify these users based on their respective authorization levels, such as identifying a user as having administrative privileges. Based on such collected user information, embodiments may generate an identity trust score that reflects a level of trust in the users that have been granted or denied access to a zero-trust resource. As described in additional detail below, in addition to such identity tenant trust scores, embodiments may support the evaluation of zero-trust resources according to several other tenant scores.

In addition to or in alternative to an entire sled 405a-n, 415a-n being designated as a zero-trust resource, one or more applications operating on these sleds 405a-n, 415a-n may be designated as zero-trust resources. For instance, a software application operating on a compute sled 405a-n of chassis 400 may be used for financial accounting and may thus be designated as a zero-trust resource. As described in additional detail below, embodiments support use of a trust scoring framework for evaluating requests from users to access such software applications operating on chassis 400 that have been designated as zero-trust resources. Also as described below, IHSs such as a compute sled 405a-n that operate a zero-trust software application may be instrumented to support the described trust scoring framework, such as by collecting information describing the identity of other users have been granted or denied access to the financial accounting application.

In some instances, specific data elements stored on sleds 405a-n, 415a-n installed in chassis 400 may be designated as zero-trust resources. For instance, information stored in a database containing protected healthcare information may be designated as a zero-trust resource. In other instances, data elements designated as zero-trust resources may include various types of files, database tables, memory regions, storage partitions, virtual drives, etc. Data elements designated as zero-trust resources may be stored on devices that may also store non-protected data such that these storage devices may or may not themselves be designated as zero-trust resources. As described in additional detail below, embodiments support controlling access to data elements designated as zero-trust resources through a trust scoring framework.

As described, a data center may include large numbers of chassis 400 that may vary significantly. Multiple chassis 400 may be housed within a rack. The modular architecture provided by the sleds, chassis and racks allow for certain resources, such as cooling, power and network bandwidth, to be shared by the compute sleds 405a-n and storage sleds 415a-n, thus providing efficiency improvements and supporting greater computational loads. For instance, certain computational workloads, such as computations used in machine learning and other artificial intelligence systems, may utilize computational and/or storage resources that are shared within an IHS, within an individual chassis 400 and/or within a set of IHSs that may be spread across multiple chassis of a data center.

For instance, pooled storage resources of chassis 400, such as pools of shared storage drives, may be used to implement a vSAN. In particular, pooled storage drives of chassis 400 may be logically organized into disk groups, where each disk group may be utilized through the vSAN as a single logical storage drive. In some instances, vSAN applications may utilize redundant data storage that mirrors data in multiple different storage drives, thus providing fault tolerance. In some instances, a vSAN application may be designated as a zero-trust resource. In other instances, only portions of the data stored in the vSAN may be designated as a zero-trust resource. In other instances, one or more of the storage drives that are members of the vSAN disk group may be designated as zero-trust resources.

Implementing computing systems that span multiple storage resources of chassis 400, such as a vSAN may utilize high-speed data links between these storage resources and processing components of the chassis, such as PCIe connections that may form one or more distinct PCIe switch fabrics that are implemented by PCIe controllers 435a-n, 465a-n installed in the IHSs 405a-n, 415a-n of the chassis. These high-speed data links may be used to support applications, such as vSANs, that span multiple processing, networking and storage components of an IHS and/or chassis 400. As described in additional detail below, in some embodiments, PCIe controllers 435a-n, 465a-n operating in chassis 400 may be instrumented to support the described trust scoring framework. For instance, PCIe controllers 435a-n, 465a-n may collect information describing the various devices, processes, applications and/or users that are utilizing a network supported by these PCIe controllers. Using such telemetry collected by a PCIe controller 435a-n, 465a-n, embodiments may identity trust indicators such as the networks, devices and applications being used to access a zero-trust resource.

Chassis 400 may be installed within a rack structure that provides at least a portion of the cooling utilized by the IHSs 405a-n, 415a-n installed in chassis 400. In supporting airflow cooling, a rack may include one or more banks of cooling fans that may be operated to ventilate heated air from within the chassis 400 that is housed within the rack. The chassis 400 may alternatively or additionally include one or more cooling fans 430 that may be similarly operated to ventilate heated air away from sleds 405a-n, 415a-n installed within the chassis. In this manner, a rack and a chassis 400 installed within the rack may utilize various configurations and combinations of cooling fans to cool the sleds 405a-n, 415a-n and other components housed within chassis 400.

The sleds 405a-n, 415a-n may be individually coupled to chassis 400 via connectors that correspond to the bays provided by the chassis 400 and that physically and electrically couple an individual sled to a backplane 460. Chassis backplane 460 may be a printed circuit board that includes electrical traces and connectors that are configured to route signals between the various components of chassis 400 that are connected to the backplane 460 and between different components mounted on the printed circuit board of the backplane 460. In the illustrated embodiment, the connectors for use in coupling sleds 405a-n, 415a-n to backplane 460 include PCIe couplings that support high-speed data links with the sleds 405a-n, 415a-n. In various embodiments, backplane 460 may support various types of connections, such as cables, wires, midplanes, connectors, expansion slots, and multiplexers. In certain embodiments, backplane 460 may be a motherboard that includes various electronic components installed thereon. Such components installed on a motherboard backplane 460 may include components that implement all or part of the functions described with regard to the SAS (Serial Attached SCSI) expander 440, network controller 440, chassis management controller 425 and/or power supply unit 435.

Figure 5:
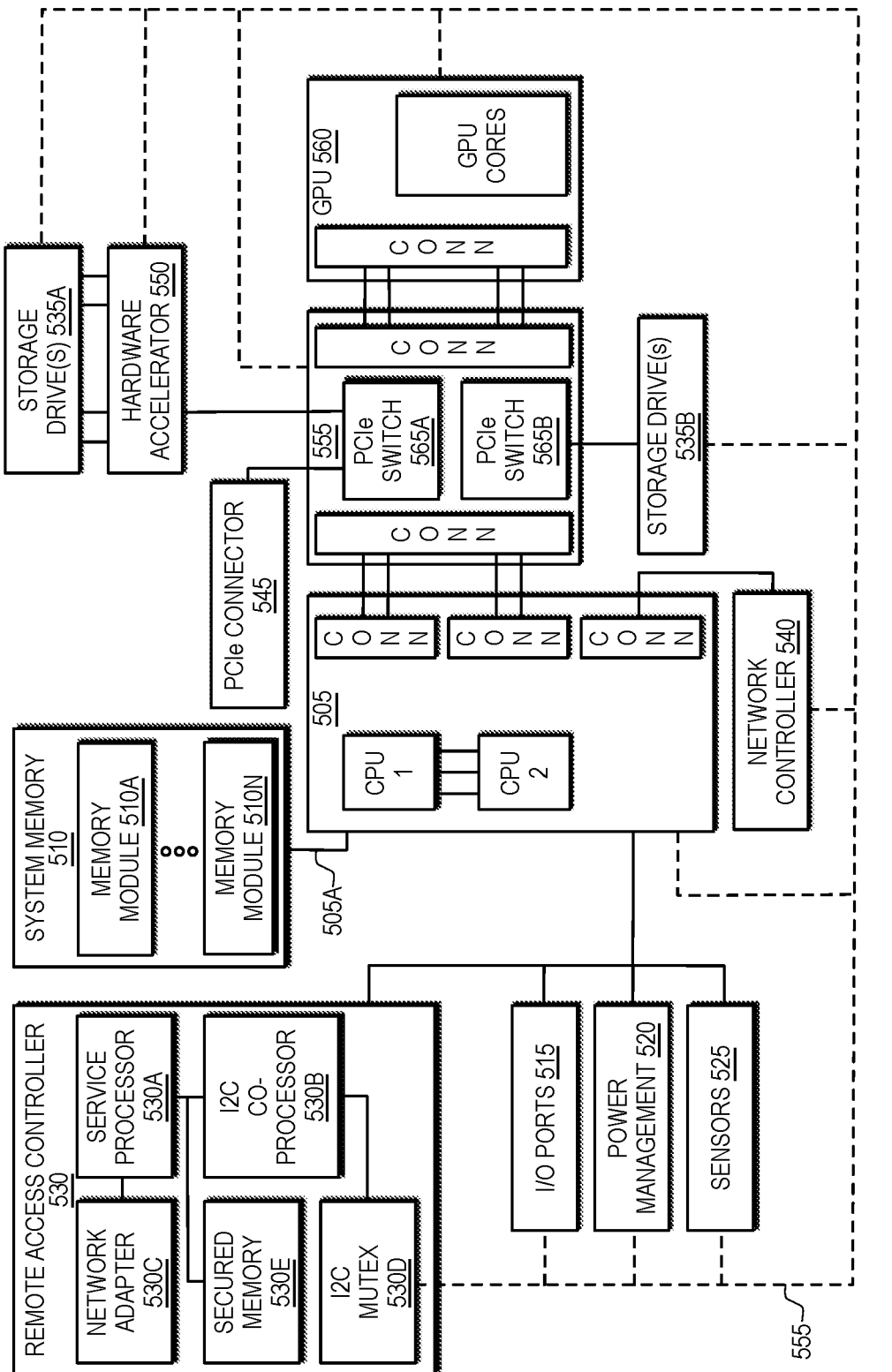
FIG. 5 is a diagram illustrating certain components of an IHS configured, according to some embodiments, to support the operation of zero-trust computing environments that utilize a trust scoring framework.

In certain embodiments, each individual compute/storage sled 405a-n, 415a-n may be an IHS such as described with regard to IHS 500 of FIG. 5. Sleds 405a-n, 415a-n may individually or collectively provide computational processing resources that may be used to support a variety of e-commerce, multimedia, business and scientific computing workloads, including machine learning and other artificial intelligence systems. Sleds 405a-n, 415a-n are regularly configured with hardware and software that provide leading-edge computational capabilities. Accordingly, services that are provided using such computing capabilities that are provided as high-availability systems that operate with minimum downtime, while still supporting secure operations of zero-trust computing environments operating using these computation capabilities of chassis 400.

As illustrated, each compute sled 405a-n and storage sled 415a-n includes a respective remote access controller (RAC) 410a-n, 420a-n. As described in additional detail with regard to FIG. 5, remote access controller 410a-n, 420a-n provides capabilities for remote monitoring and management of a respective compute sled 405a-n or storage sled 415a-n. In support of these monitoring and management functions, remote access controllers 410a-n may utilize both in-band and side-band (i.e., out-of-band) communications with various managed components of a respective compute sled 405a-n or storage sled 415a-n. Remote access controllers 410a-n, 420a-n may collect various types of sensor data, such as collecting temperature sensor readings that are used in support of airflow cooling of the chassis 400 and the sleds 405a-n, 415a-n. In addition, each remote access controller 410a-n, 420a-n may implement various monitoring and administrative functions related to a respective sleds 405a-n, 415a-n, where these functions may be implemented using sideband bus connections with various internal components of the chassis 400 and of the respective sleds 405a-n, 415a-n.

As described in additional detail with regard to IHS embodiments of FIG. 5, remote access controllers 410a-n, 420a-n installed in IHS sleds may be instrumented in various manners in order to support collection of data used in the described trust scoring framework. For instance, each of the remote access controllers 410a-n, 420a-n may collect data from the various devices that are managed by each respective remote access controller. For example, a remote access controller 410a operating within compute sled 405a may collect data from the managed PCIe controller 435a operating on that compute sled, where the collected data may provide information regarding users of PCIe networks being used to access a zero-trust resource.

In scenarios where a request has been received to access a zero-trust resource via one of these networks, the remote access controller 405a may interface with the PCIe controller 435a of the compute sled in order to collect telemetry that provides indications of trust, such as telemetry identifying the users operating on this network and security protocols in use by these users, thus providing an indication of trust in the network used to access the zero-trust resource. In scenarios where the PCIe controller 435a in the compute sled 405a is itself a zero-trust resource, the remote access controller in that sled may collect information describing each of the hardware devices and software applications of chassis 400 that are interfacing with this PCIe controller 435a, thus providing an indication of trust in this PCIe controller 435a.

The remote access controllers 410a-n, 420a-n that are present in chassis 400 may support secure connections with a remote management interface 401. In some embodiments, remote management interface 401 provides a remote administrator with various capabilities for remotely administering the operation of an IHS, including initiating updates to the software and hardware operating in the chassis 400. For example, remote management interface 401 may provide capabilities by which an administrator can initiate updates to the firmware, software or other instructions utilized by hardware components installed in a chassis 400. In some instances, remote management interface 401 may include an inventory of the hardware, software and firmware of chassis 400 that is being remotely managed through the operation of the remote access controllers 410a-n, 420a-n. The remote management interface 401 may also include various monitoring interfaces for evaluating telemetry data collected by the remote access controllers 410a-n, 420a-n. In some embodiments, remote management interface 401 may communicate with remote access controllers 410a-n, 420a-n via a protocol such the Redfish remote management interface.

In the illustrated embodiment, chassis 400 includes one or more compute sleds 105a-n that are coupled to the backplane 460 and installed within one or more bays or slots of chassis 400. Each of the individual compute sleds 405a-n may be an IHS, such as described with regard to FIG. 5. Each of the individual compute sleds 405a-n may include various different numbers and types of processors that may be adapted to performing specific computing tasks. In the illustrated embodiment, each of the compute sleds 405a-n includes a PCIe controller 435a-n that facilitates high speed access to computing resources described in additional detail with regard to FIG. 5, such as hardware accelerators, DPUs, GPUs, Smart NICs and FPGAs. These computing resources may be programmed and adapted for specific computing workloads, such as to support machine learning or other artificial intelligence systems. In embodiments, various hardware, software and data elements operating on compute sleds 105a-n, including a compute sled itself, may be designated as zero-trust resources such that access to these resources is governed using the trust scoring framework described herein.

As illustrated, chassis 400 includes one or more storage sleds 415a-n that are coupled to the backplane 460 and installed within one or more bays of chassis 400 in a similar manner to compute sleds 405a-n. Each of the individual storage sleds 415a-n may include various different numbers and types of storage devices. As described in additional detail with regard to FIG. 5, a storage sled 415a-n may be an IHS 500 that includes multiple storage drives 475a-n, where the individual storage drives 475a-n may be accessed through a PCIe controller 465a-n of the respective storage sled 415a-n. In addition to the data storage capabilities provided by storage sleds 415a-n, chassis 400 may provide access to other storage resources that may be installed as components of chassis 400 and/or may be installed elsewhere within a datacenter that houses the chassis 400. In certain scenarios, such storage resources 455 may be accessed via a SAS expander 450 that is coupled to the backplane 460 of the chassis 400. The SAS expander 450 may support connections to a number of JBOD (Just a Bunch Of Disks) storage drives 455 that, in some instances, may be configured and managed to support data redundancy using the various drives 455. In embodiments, various hardware, software and data elements operating on storage sleds 415a-n, including an individual storage sled and/or individual storage drives of a sled, may be designated as zero-trust resources such that access to these storage resources is governed by policies that use the trust scoring framework described herein.

As illustrated, the chassis 400 of FIG. 4 includes a network switch 440, such as a PCIe switch, that provides network access to the sleds 405a-n, 415a-n installed within the chassis. In some instances, network switch 440 may be an integrated component of a backplane 460 or other circuit board of chassis 400. In some instances, network switch 440 may be a replaceable component of chassis 400, such as replaceable sled that is received in a bay of the chassis 400. Network switch 440 may provide components of chassis 400 with access to external networks, either directly or indirectly via additional networking components. In some embodiments, network switch 440 may also support networking within the components of chassis 400, such as via a PCIe switch fabric that provides communications between each of the sleds 405a-n, 415a-n that are coupled to the chassis 400, and that may be used in the operation of a storage network, such as a vSAN, using the resources of chassis 400. In some embodiments, network switch 440 of chassis 400 may be instrumented in various manners in order to support collection of data used in the described trust scoring framework. For instance network switch 440 may collect various network information that may serve as indicators of trust in networks that are being used to access zero-trust resources. For example, network switch 440 may track information describing the users, devices and/or applications that use a network supported by the network switch 440 in order to access a zero-trust resource, thus providing an indication of trust in that zero-trust resource based on the networks being used to access the resource.

Chassis 400 may also include a power supply unit 435 that provides the components of the chassis with various levels of DC power. In certain embodiments, power supply unit 435 may be implemented as a replaceable sled and multiple such sleds may be used to provide chassis 400 with redundant, hot-swappable power supply units. In some embodiments, various operations supported by the power supply unit 435 of chassis 400 may be configurable, such as by chassis management controller 425. Accordingly, power supply unit 435 may be designated as zero-trust resource such that access to the power supply unit is governed by policies that use trust scoring framework described herein.

Chassis 400 may also include various I/O controllers that may support various I/O ports, such as USB ports that may be used to support keyboard and mouse inputs and/or video display capabilities. Such I/O controllers may be utilized by a chassis management controller 425 to support various KVM (Keyboard, Video and Mouse) capabilities that provide administrators with the ability to operate the IHSs installed in chassis 400. In some embodiments, various operations supported by the I/O controllers of chassis 400 may be configurable, such as by chassis management controller 425. Accordingly, these I/O controllers may be designated as zero-trust resources such that access to these I/O controllers is governed by policies that use the trust scoring framework described herein.

In addition to providing support for KVM capabilities for administering chassis 400, chassis management controller 425 may support various additional functions for sharing the infrastructure resources of chassis 400. In some scenarios, chassis management controller 425 may implement tools for managing the power 435, bandwidth available through network switch 440 and airflow cooling 140 that are available via the chassis 400. As described, the airflow cooling 430 utilized by chassis 400 may include an airflow cooling system that is provided by a rack in which the chassis 400 may be installed and managed by a cooling module of the chassis management controller 425.

As described in additional detail below, chassis management controller 425 may include a microcontroller or other logic unit that implements various management operations with respect to integrated and replaceable components of chassis 400, including operations for management of sleds 405a-n, 415a-n. For instance, in embodiments, chassis management controller 425 may be instrumented in various manners in order to support collection of telemetry that is used in the described trust scoring framework. For instance, chassis management controller 425 may collect information that may serve as indicators of trust in hardware components installed in chassis 400. Chassis management controller 425 may track users and/or processes that are currently accessing one or more of the sleds 405a-n, 415a-n installed in chassis, or that are currently accessing a management application operated by the chassis management controller 425, thus providing an indication of trust in these shared capabilities of chassis 400 that have been designated as zero-trust resources.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 5 illustrates an example embodiment of an IHS 500 that may be used to implement one or more zero-trust computing environments. Embodiments may implement one or more zero-trust computing environments using some or all of the various resources of IHS 500 described herein. Various hardware and software resources of IHS 500 may be components of one or more zero-trust computing environments. As described above with regard to the shared resources of chassis 400, access to certain of these resources of IHS 500 may be subject to one or more polices of these zero-trust computing environments. As with the shared resources of chassis 400, various software, hardware and data of IHS 500 may be designated as zero-trust resources that are accessed based on these policies. In embodiments, requests for access to zero-trust resources of IHS 500 are evaluated through policies that use a scoring framework that characterizes behavioral and environmental indicators of trust for a specific zero-trust resource and/or for the zero-trust environment.

It should be appreciated that although the embodiments described herein may describe an IHS that is a compute sled or similar computing component that may be deployed within the bays of a chassis, a variety of other types of IHSs may also operate according to embodiments described herein. In the illustrative embodiment of FIG. 5, IHS 500 may be a computing component, such as compute or storage sled 405a-n, 415a-n or other type of server, such as an 1RU server installed within a 2RU chassis, that is configured to share infrastructure resources provided within a chassis 400.

IHS 500 may utilize one or more system processors 505, that may be referred to as CPUs (Central Processing Units). In some embodiments, CPUs 505 may each include a plurality of high-power processing cores that may be separately delegated with computing tasks. Each of the CPUs 505 may be individually designated as a main processor and as a co-processor, where such designations may be based on delegation of specific types of computational tasks to a CPU 505. In some embodiments, CPUs 505 may each include an integrated memory controller that may be implemented directly within the circuitry of each CPU 505. In some embodiments, a memory controller may be a separate integrated circuit that is located on the same die as the CPU 505. Each memory controller may be configured to manage the transfer of data to and from a system memory 510 of the IHS, in some cases using a high-speed memory bus 505a. The system memory 510 is coupled to CPUs 505 via one or more memory buses 505a that provide the CPUs 505 with high-speed memory used in the execution of computer program instructions by the CPUs 505. Accordingly, system memory 510 may include memory components, such as static RAM (SRAM), dynamic RAM (DRAM), NAND Flash memory, suitable for supporting high-speed memory operations by the CPUs 505. In certain embodiments, system memory 510 may combine persistent non-volatile memory and volatile memory.

In certain embodiments, the system memory 510 may be comprised of multiple removable memory modules. The system memory 510 of the illustrated embodiment includes removable memory modules 510a-n. Each of the removable memory modules 510a-n may correspond to a printed circuit board memory socket that receives a removable memory module 510a-n, such as a DIMM (Dual In-line Memory Module), that can be coupled to the socket and then decoupled from the socket as needed, such as to upgrade memory capabilities or to replace faulty memory modules. Other embodiments of IHS system memory 510 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 500 may utilize a chipset that may be implemented by integrated circuits that are connected to each CPU 505. All or portions of the chipset may be implemented directly within the integrated circuitry of an individual CPU 505. The chipset may provide the CPU 505 with access to a variety of resources accessible via one or more in-band buses. IHS 500 may also include one or more I/O ports 515 that may be used to couple the IHS 500 directly to other IHSs, storage resources, diagnostic tools, and/or other peripheral components. A variety of additional components may be coupled to CPUs 505 via a variety of in-line busses. For instance, CPUs 505 may also be coupled to a power management unit 520 that may interface with a power system of the chassis 400 in which IHS 500 may be installed. In addition, CPUs 505 may collect information from one or more sensors 525 via a management bus.

In certain embodiments, IHS 500 may operate using a BIOS (Basic Input/Output System) that may be stored in a non-volatile memory accessible by the CPUs 505. The BIOS may provide an abstraction layer by which the operating system of the IHS 500 interfaces with hardware components of the IHS. Upon powering or restarting IHS 500, CPUs 505 may utilize BIOS instructions to initialize and test hardware components coupled to the IHS, including both components permanently installed as components of the motherboard of IHS 500 and removable components installed within various expansion slots supported by the IHS 500. The BIOS instructions may also load an operating system for execution by CPUs 505. In certain embodiments, IHS 500 may utilize Unified Extensible Firmware Interface (UEFI) in addition to or instead of a BIOS. In certain embodiments, the functions provided by a BIOS may be implemented, in full or in part, by the remote access controller 530.

In some embodiments, IHS 500 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 500. These calculated hash values may then be compared against reference hash values that were previously stored in a secure non-volatile memory of the IHS, such as during factory provisioning of IHS 500. In this manner, a TPM may establish a root of trust that includes core components of IHS 500 that are validated as operating using instructions that originate from a trusted source.

In some embodiments, various operations supported by the TPM may be configurable, such as by remote access controller 530. Accordingly, whether TPM is an integrated microcontroller or is an a SoC function of a secure processor, the TPM may be designated as zero-trust resource that is accessed according to polices that are evaluated using a trust scoring framework. In some embodiments, a TPM of IHS 500 may be instrumented in various manners to support the collection of data used in the described trust scoring framework. For instance, a TPM may collect and report information describing the hardware components of the IHS 100 that are currently accessing the TPM, thus providing an indication of trust in the TPM itself based on the security characteristics of the hardware of IHS 500 that is accessing the TPM. A TPM may be similarly instrumented to provide information identifying the users or applications that are currently accessing the TPM.

As illustrated, CPUs 505 may be coupled to a network controller 540, such as provided by a Network Interface Controller (NIC) card that provides IHS 500 with communications via one or more external networks, such as the Internet, a LAN, or a WAN. In some embodiments, network controller 540 may be a replaceable expansion card or other component that is coupled to a connector (e.g., PCIe connector of a motherboard, backplane, midplane, etc.) of IHS 500. In some embodiments, network controller 540 may support high-bandwidth network operations by the IHS 200 through a PCIe interface that is supported by the chipset of CPUs 505. As with the network switch 440 of chassis 400, network controller 540 may be instrumented in various manners in order to support collection of data used in the described trust scoring framework. For instance, network controller 540 may collect various network information that provides indications of trust in a network that is being used to access a zero-trust resource. For example, network controller 540 may track information describing the users that are currently using a specific network supported by the network controller 540, and/or users that are accessing other functions supported by the network controller 540, thus providing an indication of trust in that network and/or network controller 540 when used to access a particular zero-trust resource.

As indicated in FIG. 5, in some embodiments, CPUs 505 may be coupled to a PCIe card 555 that includes two PCIe switches 565a-b that operate as I/O controllers for PCIe communications, such as TLPs (Transaction Layer Packets), that are transmitted between the CPUs 505 and PCIe devices and systems coupled to IHS 500. Whereas the illustrated embodiment of FIG. 5 includes two CPUs 505 and two PCIe switches 565a-b, different embodiments may operate using different numbers of CPUs and PCIe switches. In addition to serving as I/O controllers that route PCIe traffic, PCIe switches 565a-b include switching logic that can be used to expand the number of PCIe connections that are supported by CPUs 505. PCIe switches 565a-b may multiply the number of PCIe lanes available to CPUs 505, thus allowing more PCIe devices to be connected to CPUs 505, and for the available PCIe bandwidth to be allocated with greater granularity.

As with network controller 540, each respective PCIe switch 565a-b may be instrumented in various manners in order to support collection of data used in the described trust scoring framework. For instance, a PCIe switch 565a-b may collect information that provides indications of trust in a network that is being used to access a zero-trust resource. For example, a PCIe switch 565a-b may track information describing the users, devices or applications that are currently using a specific PCIe connection supported by the PCIe switch 565a-b, such as users utilizing a set of PCIe lanes, and/or users that are accessing other functions supported by that particular PCIe switch 565a-b, thus providing an indication of trust in that network and/or PCIe switch 565a-b when used to access a particular zero-trust resource, such as in accessing a hardware accelerator 550 that has been designated as a zero-trust resource.

As indicated in FIG. 5, IHS 500 may support storage drives 535a-b in various topologies in the same manner as described with regard to the use of the various storage resources described with regard to the chassis 400 of FIG. 4. In the illustrated embodiment, storage drives 535a are accessed via a hardware accelerator 550, while storage drives 535b are accessed directly via PCIe switch 565b. In some embodiments, the hardware accelerator 550 and storage drives 535a may be components of a separate sled, such as a storage sled 415a-n. In some embodiments, the storage drives 535a-b of IHS 500 may include a combination of both SSD and magnetic disk storage drives. In other embodiments, all of the storage drives 535a-b of IHS 500 may be identical, or nearly identical. As described, the storage drives 535a-b that are accessible via IHS 500 may be pooled and used to provide redundant storage, such as provided by a vSAN application supported by the chassis 400 in which the IHS 500 is installed.

In some embodiments, each individual storage drive 535a-b of IHS 500 may be designated as a zero-trust resource that is accessed according to policies that are evaluated using the trust scoring framework described herein. In some embodiments, a collection of storage drives 535a-b may be designated as a zero-trust resource, such as a group of storage drives used to implement a vSAN. In some embodiments, a software application, such as a database instance, operating on a storage drive 535a-b may be designated as a zero-trust resource. In some embodiments, specific data that is stored by a storage drive 535a-b may be designated as zero-trust resources, such as a zero-trust resource designation for a specific stored file. In some embodiments, an individual storage drive 535a-b may be instrumented in various manners in order to support collection of data used in the described trust scoring framework, such as in identifying users or other hardware of IHS 500 that are currently accessing the storage drive.

As illustrated, PCIe switch 565a is coupled via a PCIe link to a hardware accelerator 550, such as a DPU, SmartNIC, GPU and/or FPGA, that may be a connected to the IHS via a removeable card or baseboard that couples to a PCIe connector of the IHS 500. In some embodiments, hardware accelerator 550 includes a programmable processor that can be configured for offloading functions from CPUs 505. In some embodiments, hardware accelerator 550 may include a plurality of programmable processing cores and/or hardware accelerators, that may be used to implement functions used to support devices coupled to the IHS 500.

In some embodiments, a hardware accelerator 550 of IHS 500 may be designated as a zero-trust resource that is accessed and operated according to policies that are evaluated using the trust scoring framework described herein. In some embodiments, a software application operating on a hardware accelerator 550 may be designated as a zero-trust resource. For instance, a hardware accelerator 550 may include one or more FPGAs that are programmable via software functions supported by the hardware accelerator. Such software applications of hardware accelerator 550 that are for use in programming FPGA operations may be designated as zero-trust resources, and thus accessed according to evaluation of trust-score-based policies of the zero-trust computing environment. For example, in evaluating whether to grant a user with access to an application for programming the hardware accelerator 550, relevant policies may utilize the trust scoring framework to evaluate risks posed by factors such as the other applications that are currently operating on the hardware accelerator, or such as the other users that are currently accessing the hardware accelerator. In some embodiments, data that is stored by a hardware accelerator 550 may be designated as a zero-trust resource. For instance, a file that stores instructions used in programming the hardware accelerator 550 may itself be designated as a zero-trust resource. In some embodiments, a hardware accelerator 550 may be instrumented in various manners in order to support collection of data used in the described trust scoring framework, such as in identifying other devices currently accessing the hardware accelerator 550 and/or users that are currently operating applications on the hardware accelerator 550.

As illustrated in FIG. 5, PCIe switches 565a-b may also support PCIe couplings with one or more GPUs (Graphics Processing Units) 560. Embodiments may include one or more GPU cards, where each GPU card is coupled to one or more of the PCIe switches 565a-b, and where each GPU card may include one or more GPUs 560. In some embodiments, PCIe switches 565a-b may transfer instructions and data for generating video images by the GPUs 560 to and from CPUs 505. Accordingly, GPUs 560 may include on or more hardware-accelerated processing cores that are optimized for performing streaming calculation of vector data, matrix data and/or other graphics data, thus supporting the rendering of graphics for display on devices coupled either directly or indirectly to IHS 500. In some workloads, GPUs may be utilized as programmable computing resources for offloading other functions from CPUs 505, in the same manner as hardware accelerator 550.

As with hardware accelerator 550, one or more of the GPUs 560 of IHS 500 may be designated as zero-trust resources that are accessed and operated according to policies that utilize the trust scoring framework described herein. In addition or in alterative, one or more software applications supported by GPUs 560 may be designated as zero-trust resources, such as a diagnostic application for use in monitoring the resource availability of the GPUs 560. Alternatively or in further addition, data stored by the GPUs 560 may be designated as zero-trust resource. For instance, data files that are used as training data sets for machine learning applications operating on the GPUs 560 may be designated as zero-trust resources due to the inclusion of protected health-care information. In some embodiments, GPUs 560 may be instrumented in various manners in order to support collection of data used in the described trust scoring framework, such as in identifying other devices currently accessing a respective GPU 560 or other users currently operating applications on a respective GPU 560.

As illustrated in FIG. 5, PCIe switches 565a-b may support PCIe connections in addition to those utilized by GPUs 560 and hardware accelerator 550, where these connections may include PCIe links of one or more lanes. For instance, PCIe connectors 545 supported by a printed circuit board of IHS 500 may allow various other systems and devices to be coupled to the IHS. Through couplings to PCIe connectors 545a, a variety of data storage devices, graphics processors and network interface cards may be coupled to IHS 500, thus supporting a wide variety of topologies of devices that may be coupled to the IHS 500 and that may be used in supporting redundant data storage systems.

As described, IHS 500 includes a remote access controller 530 that supports remote management of IHS 500 and of various internal components of IHS 500. In certain embodiments, remote access controller 530 may operate from a different power plane from the processors 505 and other components of IHS 500, thus allowing the remote access controller 530 to operate, and management tasks to proceed, while the processing cores of IHS 500 are powered off. Various functions provided by the BIOS, including launching the operating system of the IHS 500, and/or functions of a TPM may be implemented or supplemented by the remote access controller 530. In some embodiments, the remote access controller 530 may perform various functions to verify the integrity of the IHS 500 and its hardware components prior to initialization of the operating system of IHS 500 (i.e., in a bare-metal state). In some embodiments, certain operations of the remote access controller 530, such as the operations described herein for support of zero-trust computing environments, may operate using validated instructions, and thus within the root of trust of IHS 500.

In some embodiments, remote access controller 530 may include a service processor 230a, or specialized microcontroller, that operates management software that supports remote monitoring and administration of IHS 500. The management operations supported by remote access controller 530 may be remotely initiated, updated and monitored via a remote management interface 401, such as described with regard to FIG. 4. Remote access controller 530 may be installed on the motherboard of IHS 500 or may be coupled to IHS 500 via an expansion slot or other connector provided by the motherboard. In some instances, the management functions of the remote access controller 555 may utilize information collected by various managed sensors 525 located within the IHS. For instance, temperature data collected by sensors 525 may be utilized by the remote access controller 530 in support of closed-loop airflow cooling of the IHS 500. As indicated, remote access controller 530 may include a secured memory 530e for exclusive use by the remote access controller in support of management operations.

In some embodiments, remote access controller 530 may implement monitoring and management operations using MCTP (Management Component Transport Protocol) messages that may be communicated to managed devices 505, 535a-b, 540, 550, 555, 560 via management connections supported by a sideband bus 555. In some instances, the sideband management connections supported by remote access controller 530 may include PLDM (Platform Level Data Model) management communications with the managed devices 505, 535a-b, 540, 550, 555, 560 of IHS 500. In some embodiments, the remote access controller 230 may additionally or alternatively use MCTP messaging to transmit Vendor Defined Messages (VDMs) via the in-line PCIe switch fabric supported by PCIe switches 565a-b. For instance, remote access controller 530 may transmit firmware to managed devices utilizing inband signaling, such as VDMs that are transmitted using MCTP over the PCIe switch fabric that is implemented by PCIe switch 555, and/or utilizing sideband signaling, such as PLDM communications transmitted via sideband connections 555 supported by an I2C co-processor 530b of the remote access controller 530.

As illustrated, remote access controller 530 may include a network adapter 230c that provides the remote access controller with network access that is separate from the network controller 540 utilized by other hardware components of the IHS 500. Through secure connections supported by network adapter 530c, remote access controller 530 communicates management information with remote management interface 401. In support of remote monitoring functions, network adapter 530c may support connections between remote access controller 555 and external management tools using wired and/or wireless network connections that operate using a variety of network technologies.

Remote access controller 530 supports monitoring and administration of the managed devices of an IHS via a sideband bus interface 555. For instance, messages utilized in device and/or system management may be transmitted using I2C sideband bus 555 connections that may be individually established with each of the respective managed devices 505, 535*a-b*, 540, 550, 555, 560 of the IHS 500 through the operation of an I2C multiplexer 530*d* of the remote access controller. As illustrated in FIG. 5, the managed devices 505, 535*a-b*, 540, 550, 555, 560 of IHS 500 are coupled to the CPUs 505, either directly or directly, via in-line buses that are separate from the I2C sideband bus 555 connections used by the remote access controller 530 for device management.

In certain embodiments, the service processor 530*a* of remote access controller 530 may rely on an I2C co-processor 530*b* to implement sideband I2C communications between the remote access controller 530 and the managed hardware components 505, 535*a-b*, 540, 550, 555, 560 of the IHS 500. The I2C co-processor 530*b* may be a specialized co-processor or micro-controller that is configured to implement a I2C bus interface used to support communications with managed hardware components 505, 535*a-b*, 540, 550, 555, 560 of IHS. In some embodiments, the I2C co-processor 530*b* may be an integrated circuit on the same die as the service processor 530*a*, such as a peripheral system-on-chip feature that may be provided by the service processor 530*a*. The sideband I2C bus 555 is illustrated as single line in FIG. 5. However, sideband bus 555 may be comprises of multiple signaling pathways, where each may be comprised of a clock line and data line that couple the remote access controller 530 to I2C endpoints 505, 535*a-b*, 540, 550, 555, 560.

In some embodiments, remote access controller 530 may be instrumented in various manners in order to support collection of telemetry data that is used in the described trust scoring framework. As described, a variety of hardware components of IHS 500 may be designated as zero-trust resources that are accessed according to policies of a zero-trust computing environment. In instances where a hardware component of IHS 500 has been designated as a zero-trust resource, evaluation of requests to access these hardware components may be determined based on polices that evaluate a trust score that is calculated for that particular hardware component and/or for the zero-trust environment. As described in additional detail below, a trust score for a particular hardware component may be calculated based on factors such as characteristics of other hardware components that are currently accessing the requested hardware component, and/or based on the identity of other users that are currently accessing the requested hardware.

In some embodiments, the sideband management capabilities of the remote access controller 530 may be instrumented to collect such indications of trust from a managed hardware component 505, 535*a-b*, 540, 550, 555, 560 that has been designated as a zero-trust resource, and for which an access request has been received. Accordingly, in some embodiments the remote access controller 530 may issue requests to managed hardware component 505, 535*a-b*, 540, 550, 555 via sideband signaling pathways 555 in order to determine whether any of these managed hardware components are currently accessing a hardware component that is the target of an access request. In this same manner, the sideband 555 management connections supported by remote access controller 530 may be used to collect other indicators of trust from the managed hardware component 505, 535*a-b*, 540, 550, 555, such as other users currently accessing those managed components, networks being utilized by these managed components and applications operating on these managed hardware components.

In various embodiments, an IHS 500 does not include each of the components shown in FIG. 5. In various embodiments, an IHS 500 may include various additional components in addition to those that are shown in FIG. 5. Furthermore, some components that are represented as separate components in FIG. 5 may in certain embodiments instead be integrated with other components. For example, in certain embodiments, all or a portion of the functionality provided by the illustrated components may instead be provided by components integrated into the one or more processor(s) 505 as a systems-on-a-chip.

Figure 6:
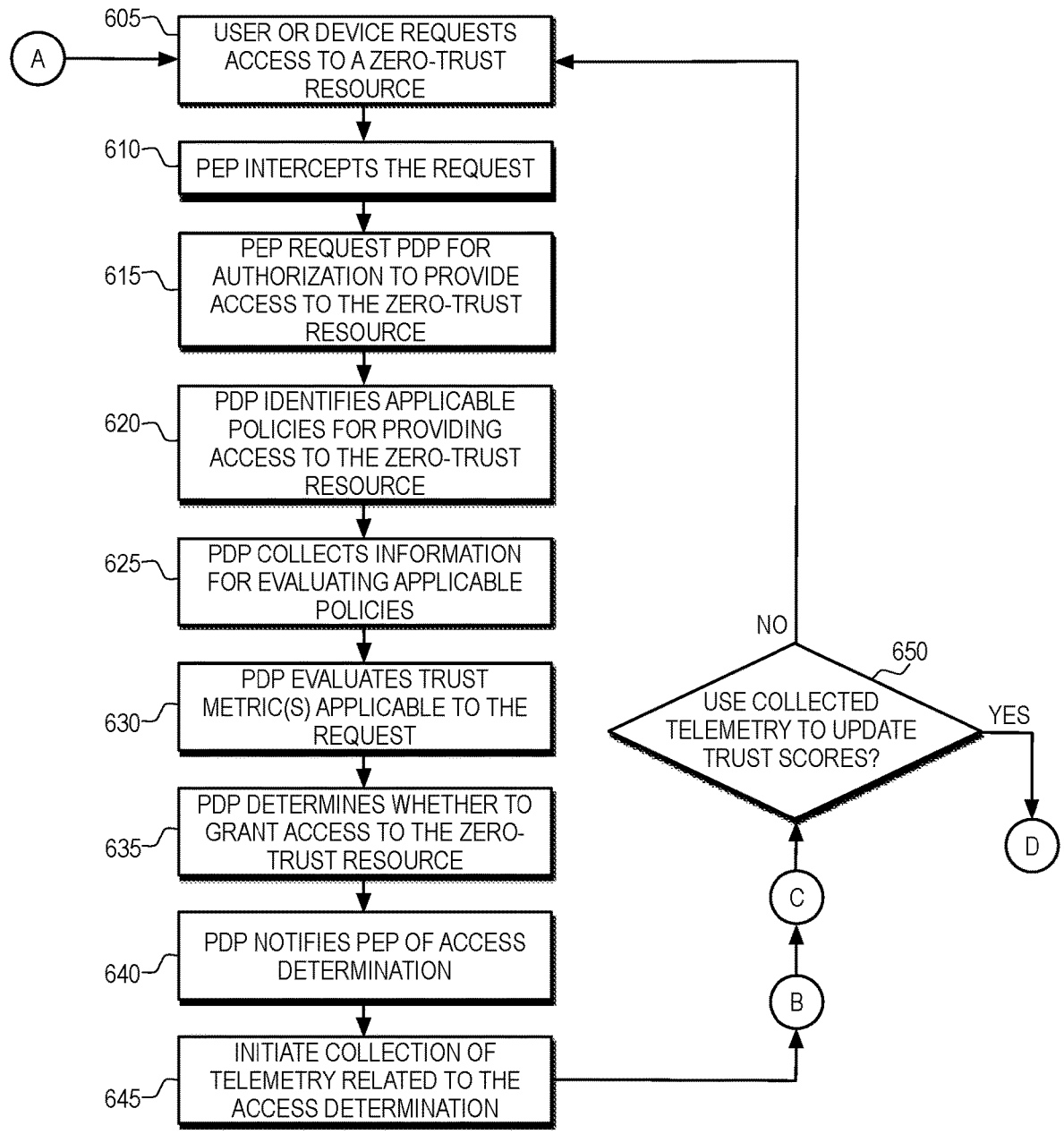
FIG. 6 is a flowchart describing certain steps of a process according to various embodiments for the use of a trust scoring framework in a zero-trust environment.

FIG. 6 is a flowchart describing certain steps of a process 600 according to various embodiments for the use of a trust scoring framework in a zero-trust environment. The illustrated embodiment is initiated, at 605, with a user 310 or device 315 requesting access to a zero-trust resource 340 of the zero-trust environment 300. As described, zero-trust resources 340 may include any hardware, software or data within the zero-trust computing environment 300. In one example, a zero-trust resource 340 may be a hardware component within the zero-trust environment 300, such as a compute sled 405*a* installed in chassis 400 of FIG. 4 or a hardware accelerator in the IHS 500 of FIG. 500. Also as described, a zero-trust resource 340 may be a software application operating within the zero-trust environment 300, such as a vSAN operating across one or more of the storage resources of the chassis 400 of FIG. 4 or such as an administrative application used to configure the GPU cores 560 of the IHS 500. Also as described, zero-trust resource 340 may be a specific data element within the zero-trust environment 300, such as in instruction file used to program a hardware accelerator 550 of the IHS of FIG. 5.

At 610, a request to access a zero-trust resource 340 is intercepted by a policy enforcement point 320. In light of the different types of zero-trust resources 340 within a zero-trust environment 300, policy enforcement points 320 may be implemented by various components within a data center. In the above example that includes a request for access to a storage sled 405*a*, a policy enforcement point 320 may be implemented by the operating system of the compute sled 405 that has been designated a zero-trust resource 340, where the operating system evaluates all requests to access the storage sled according to the requirements of the zero-trust environment 300. In the example requesting access to a vSAN application, a policy enforcement point 320 may be implemented by the vSAN application itself. In the example requesting access to a data file of the hardware accelerator, the hardware accelerator may implement the policy enforcement point 320 used to govern access to the data file. In some instances, cloud resources within the zero-trust computing environment 300 may serve as policy enforcement point 320.

Based on the requirements of the zero-trust environment 300, at 615, the policy enforcement point 320 requests authorization to provide the requestor 320 with access to the requested zero-trust resource 340, where the request is issued to a policy decision point 335 of the zero-trust environment. In some embodiments, a policy enforcement point 320 may be implemented as a cloud resource that operates on behalf of the zero-trust environment 300 such that the policy decision point 335 serves a variety of policy enforcement points 320 and has access to various data sources that may be used as sources of information in the evaluation of the policies 350 that govern access to zero-trust resources 340. In some embodiments, a policy enforcement point 320 may be implemented by a specific component within the zero-trust environment 300, such as by a designated compute sled 405a, IHS 500 or remote access controller 530.

Once a request has been received by the policy decision point 335, at 620, the policies are identified that are applicable for evaluating access to the requested zero-trust resource 340. In embodiments, the policy decision point 335 may query one or more repositories in order to identify the policies 350 that are applicable to the request, where individual policies may be applicable for some or all requestors 305 of a zero-trust resource 340. At 625, the policy decision point 335 collects information necessary for evaluation of the applicable policies. For instance, the policy decision point 335 may collect information that identifies the geographic location of the requestor 305 in order to satisfy the requirements of policies that restrict access to a zero-trust resource 340 to users that are physically located within a corporate campus, or to satisfy policies that prohibit access to requestors 305 that are located in certain geographic areas. The policy decision point 335 may also collect information characterizing the security of the device being used to request access to the zero-trust resource 340 in order to satisfy the requirements of policies that prohibit providing access to a zero-trust resource 340 to non-recognized devices, thus limiting access to known corporate-issued devices.

At 630, the policy decision point 335 evaluates applicable policies based on one or more trust scores. As described, embodiments may utilize a trust scoring framework in order to generate trust scores for individual zero-trust resources 340 and/or for the zero-trust environment 300. Policies may set forth various requirements and restrictions that may be applicable based on available trust scores. For instance, a policy for providing access to a GPU 560 of an IHS 500 may require a trust score for that GPU that is above a certain threshold, or that is classified in a particular manner (e.g., a low risk level). In another example, a policy for providing access to data that is redundantly stored within a vSAN may require a relatively lower trust score.

Based on the trust score and any other requirements of the applicable polices, at 635, the policy decision point 335 determines wither to grant the requestor 305 with access to the zero-trust resource 340. At 640, the policy decision point 335 notifies the policy enforcement point 320 of the access determination, and of any qualifications or restrictions on any access to the requested resource that has been authorized. At this point, the policy enforcement point 320 may notify the requestor 305 of the determination and, if authorized, the requestor 305 may being accessing the requested zero-trust resource 340.

However, as indicated at 645 of FIG. 6, embodiments may continue with the collection of telemetry related to the decision by the policy decision point 335 to allow or deny the requestor 305 with access to the zero-trust resource 340. As described in additional detail with regard to FIG. 8, embodiments may utilize various resources of a chassis 400 and/or IHS 500 that is part of the zero-trust environment 300 in order to collect telemetry that provides indications of trust in the zero-trust resource 340 and/or in the zero-trust environment 300. Once such telemetry has been collected, at 650, embodiments may determine whether to use the collected telemetry for updating the trust scores that are available for use within the zero-trust environment 300.

In some instances, trust scores may be updated any time additional access-determination telemetry has been collected. In such instances, the trust scores reflect the most up-to-date security posture of the zero-trust resources 340, and of the overall zero-trust environment 300. However, in some instances, access-determination telemetry may be collected and stored for use in updating trust scores during idle intervals. Since updating trust scores each time additional telemetry is collected may result in contention for computational and storage capabilities of the zero-trust environment 300, embodiments may collect and store telemetry for batch processing during idle intervals.

Some embodiments may support collection of telemetry that is configurable based on outputs of the trust score scoring framework. For instance, the frequency (i.e., sampling rate) of the collection of telemetry within a zero-trust environment may be adjusted in light of trust characteristics for that environment. For instance, the frequency of telemetry collection and/or evaluation may be adjusted in light of the overall trust score for the zero-trust environment, or based on an overall tenant trust score for the zero-trust environment. As described, the individual trust scores for zero-trust resources may be aggregated to generate an overall trust score for the zero-trust environment. In this same manner, aggregated tenant scores may be generated for the zero-trust environment, such as an aggregated identity tenant trust score for the zero-trust environment that is generated from the identity tenant trust scores for the individual zero-trust resources. In some embodiments, the frequency of telemetry collection and/or evaluation may be increased based on the trust score for a zero-trust environment dropping below a threshold level, thus indicating an increased security risk within the environment. Similarly, this frequency of telemetry collection and/or evaluation may be decreased based on the trust score for a zero-trust environment rising above a threshold level that indicates a low level of risk within the environment.

As indicated in FIG. 6, in scenarios where processing of collected telemetry will be deferred, embodiments return to 605 with the receipt of additional requests to access zero-trust resources 340. In scenarios where computational resources are available to support it, embodiments proceed to FIG. 7 where a batch of collected telemetry data may be processed to generate updates to trust scores.

Figure 7:
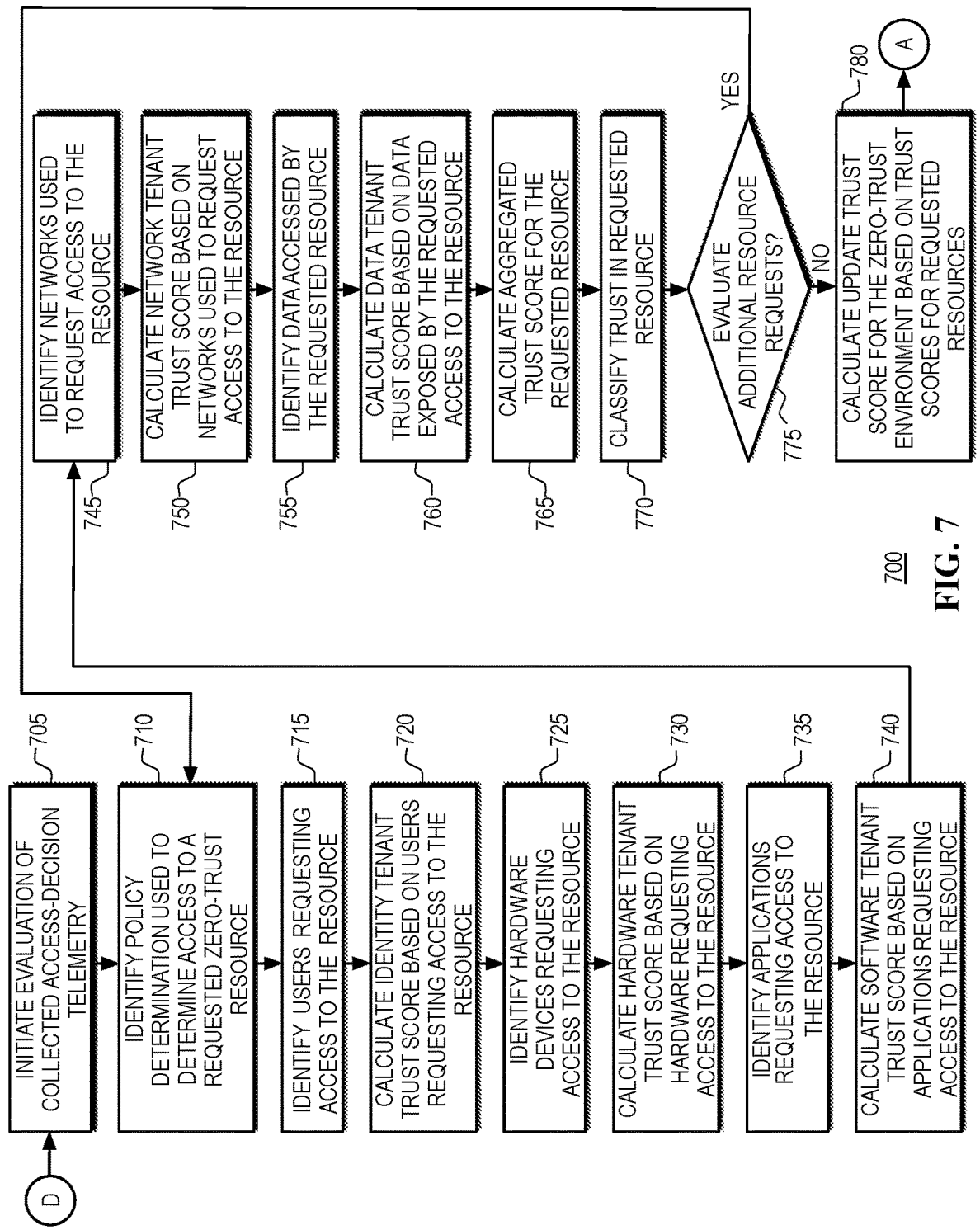
FIG. 7 is a flowchart describing certain steps of an additional process according to various embodiments for updating trust scores used in a trust scoring framework of a zero-trust environment.

FIG. 7 is a flowchart describing certain steps of an additional process 700 according to various embodiments for updating a trust score used in a trust scoring framework of a zero-trust environment. As indicated, embodiments may begin, upon transfer from FIG. 6, with the initiation of procedures for evaluation of collected access-decision telemetry in order to update trust scores for use by the scoring framework. As described in additional detail with regard to FIG. 8, with each request for a zero-trust resource 340, embodiments collect telemetry data providing indications of trust in the requested resource and/or in the overall zero-trust environment 300. As described this telemetry data may be collected for later batch processing in order to update the trust scores for the individual resources and/or the overall environment.

From the batch of telemetry that has been collected, some embodiments may continue, at 710, by selecting an access decision for a requested zero-trust resource 340 and by identifying the policies that were used by the policy decision point 335 in making the access decision. As described in additional detail below, embodiments may support instrumented data center resources, such as the chassis 400 of FIG. 4 and the IHS 500 of FIG. 5, that collect telemetry data for use in making access decisions within a zero-trust environment 300. In some instances, the collected telemetry may include the policies that were evaluated in making the access decision, as well as any applicable policies that were not used in the evaluation process.

Once the policies relevant to the access decision have been identified, at 715, embodiments may evaluate the security risk posed by user that have previously requested access to the zero-trust resource 340. Embodiments may thus identify within the collected telemetry all users 310 of the zero-trust environment 300 that requested access to the requested zero-trust resource 340, whether or not that request was approved or denied by the policy decision point 335. Embodiments may separately identify individuals that are not recognized users 310 of the zero-trust environment 300 and that issued requests that were denied, whether by the policy enforcement point 320 due to authentication failure, or by the policy decision point 335 based on a policy 350 evaluation that resulted in a rejection. Such distinctions may be used in the calculation of an identity tenant trust score that characterizes the level of risk that is posed by the identity of individuals requesting access to the zero-trust resource 340 over a recent interval.

Accordingly, at 720, embodiments may calculate an updated identity tenant trust score based on the respective identities of these users identified in the collected telemetry as requesting access to the zero-trust resource 340. If no prior identity tenant trust score is available for the zero-trust resource 340, embodiments may begin with a default base score that is then adjusted upwards or downwards based on the user identity information that has been identified in the collected telemetry. When a prior identity tenant score is available, that tenant score may then be adjusted upwards or downwards based on the additional user identity information in the collected telemetry. For instance, downwards adjustments may be made based on user identity information such as the number and/or frequency of requests for the zero-trust resource 340 over the recent interval in the collected telemetry by users. In another illustrative example, downwards adjustments of a smaller magnitude may be made based on the number of requests for the zero-trust resource 340 made by authenticated users 310, where the request was denied based on evaluation of the applicable policies.

In some embodiments, upwards adjustments may be made to the identity tenant trust score for a zero-trust resource 340 based on classifications of the authenticated users 310 that have been granted access to the zero-trust resource 340 based on applicable policies, such as due to only users 310 from a particular organization accessing the resource, or such as only by users 310 with valid administrative privileges within the zero-trust computing environment 300. In some embodiments, upwards adjustments may be made to the identity tenant trust score for a resource based on a low number of requests for the resource over a recent telemetry interval and/or over intervals spanning multiple telemetry collections. Through such adjustments, an identity tenant trust score is updated to reflect recent activity that indicates a higher or lower risk associated with that resource, thus resulting in adjustments by the zero-trust environment 300 in evaluating future requests for access to this particular zero-trust resource 340.

In some embodiments, the adjustments made based on evaluation of policy decisions may be determined based on weights assigned to the polices and/or to specific actions supported by the policies. For instance, a policy may specify separate weights for use in evaluating requests for read, update or delete operations with respect to a zero-trust resource. In one illustrative example, a policy may specify a low weight (e.g., 0.1) for requests to read (or otherwise access without modifications) operations with respect to a zero-trust resource, a medium weight (e.g., 0.2) for requests to modify a resource, and a high weight (e.g., 0.5) for requests to make deletions with respect to a resource. Using such weights, embodiments may generate the described adjustments to the trust score for resources based on the evaluation of policy decisions for that resource. For instance, a low weight may be used for making downward adjustments in response to a denied request to read a data element, and the high weight may be used for making larger downward adjustments in response to denied requests to delete that data element. In various embodiments, such weights may be used to adjust individual tenant scores for a resource, or may instead be used to adjust the aggregated trust score for that resource.

Once an identity tenant trust score has been calculated, at 725, embodiments may evaluate the security risk posed by hardware devices requesting access to the zero-trust resource 340. Embodiments may thus identify in the collected telemetry all hardware devices 315 of the zero-trust environment 300 that request access to the requested zero-trust resource 340 or that were used in requesting the access, whether or not that request was approved or denied by the policy decision point 335. As with the user information, embodiments may separately identify devices 315 that are not recognized by the zero-trust environment 300 and that issued requests that were denied, whether by the policy enforcement point 320 due to authentication failure, or by the policy decision point 335 due to policy 350 evaluation.

Using all available hardware information in the collected telemetry for the access decision, at 730, embodiments may calculate an updated hardware tenant trust score based on security characteristics of the hardware devices 315 identified in the collected telemetry as requesting access to the zero-trust resource 340. If no prior hardware tenant trust score is available for the zero-trust resource 340, embodiments may begin with a default base tenant score that is then adjusted upwards or downwards based on the collected device information for the access decision that is being evaluated. When a prior hardware tenant trust score is available, that tenant score may then be adjusted upwards or downwards based on the information in the collected telemetry that identifies hardware requesting access to the zero-trust resource.

For example, downwards adjustments may be made to a hardware tenant trust score based on hardware information such as the number of requests for the zero-trust resource 340 over the recent interval in the collected telemetry by hardware devices that were not successfully authenticated according to policy requirements, and/or by hardware devices that were successfully authenticated for the first time by this particular policy enforcement point 320. In another illustrative example, downward adjustments may be made based on the number of requests for the zero-trust resource 340 by hardware devices 315 of certain types, such as by mobile phones. In some embodiments, the types of hardware devices that may result in downward adjustments may include access requests by any device other than an IHS 500 that utilizes a remote access controller 530 that can attest to authenticity of remote management requests that triggered the request for access to the zero-trust resource 340, such as a request for access to an instruction file used to program a hardware accelerator 550.

In some embodiments, upwards adjustments may be made to the hardware tenant trust score for a zero-trust resource 340 based on classifications of the authenticated devices 315 that have been granted access to the zero-trust resource 340, such as due to access granted to devices that are configured such as IHS 500 to utilize a remote access controller 530. In some embodiments, upwards adjustments may be made to the hardware tenant trust score for a resource based on a low number of requests for the resource by portable devices such as laptops, tablets and mobile phones. Through such adjustments, the hardware tenant trust score for a zero-trust resource 340 is updated to reflect the security posture of the resource and/or environment based on the hardware devices that have recently accessed the zero-trust resource 340, thus indicating a higher or lower risk associated with that resource, and also resulting in adjustments by the zero-trust environment 300 in evaluating future requests for access to this particular zero-trust resource 340.

Once user identity and hardware tenant trust scores have been calculated, at 735, some embodiments may evaluate the security risk posed by the software applications accessing the requested zero-trust resource 340. Embodiments may thus identify, within the telemetry being evaluated, all software applications operating within the zero-trust environment 300 have requested access to the zero-trust resource 340 and/or that have been used in requesting the access. Such applications may represent a variety system operating within a data center, such as administrative applications, cloud-based operations supported on behalf of third parties and various virtualized systems operating within a zero-trust environment, such as a vSAN. As described, a user 305 or device 315 may be authenticated and provided with access to a zero-trust resource 340. As described in additional detail with regard to FIG. 8, embodiments may utilize available telemetry capabilities to identify the software applications running within the zero-trust environment 300 that are utilized to request access a zero-trust resource 340.

Using any such available application information in the collected telemetry for the access decision, at 740, embodiments may calculate an updated software tenant trust score based on security and other characteristics of the applications identified in the collected telemetry as being used to access the zero-trust resource 340. If no prior software tenant trust score is available for the zero-trust resource 340, embodiments may begin with a default base score that is then adjusted upwards or downwards based on the collected software application information for the access decision that is being evaluated. When a prior software tenant trust score is available, that score may then be adjusted upwards or downwards based on the software application information in the collected telemetry.

For example, downwards adjustments to the software tenant trust score may be made based on application information such as the number and/or frequency of requests for the zero-trust resource 340 over the recent interval within the collected telemetry by non-administrative applications, in particular in scenarios where applicable policies restrict access to a zero-trust resource to a particular set of software application. Data center administrators may utilize a variety of manual and automated administrative tools. Such tools may utilize standardized management protocols, such as REDFISH, that may be distinguished as being in support of administrative applications. Accordingly, some policies may set forth requirements that limit access to request made using known administrative tools, such as using REDFISH tools As described in additional detail with regard to FIG. 8, policy enforcement points 320 may be instrumented to collect session information for requests for zero-trust resources 340, where the collected session information may be utilized to identify applications that use such management protocols to access the zero-trust resource 340. In this same manner, collected session information may be used to identify applications that support, or fail to support, certain security protocols, thus indicating a level of trustworthiness in the application used to access the zero-trust resource 340. Embodiments may utilize the collected session information to categorize the security risk posed by the applications used to access the zero-trust resource 340, such as based on the security protocols supported by the application.

In some embodiments, the software tenant trust score may be adjusted upwards based on collected session information indicating only administrative applications being used to access the zero-trust resource 340. Conversely, downward adjustments may be made based on the indication of any non-administrative applications being used to access the resource. In another illustrative example, downwards adjustments may be made based applications accessing the zero-trust resource 340 using supported, but not the most current or most secure, version of security protocols, such as using low-grade encryption. Through such adjustments, the software tenant trust score for a zero-trust resource 340 is updated to reflect the security posture of the resource and/or environment in light of the software applications recently used to access the zero-trust resource 340, thus indicating a change in risk associated with that resource, and also resulting in adjustments by the zero-trust environment 300 in evaluating future requests for access to this particular zero-trust resource 340.

In addition to updates to user identity, hardware and software application tenant trust scores, at 745, some embodiments may evaluate the security risk posed by the networks being used to request access to the zero-trust resource 340. Embodiments may thus identify the networks used by the devices 305, devices 315 and/or software applications in request access to the zero-trust resource 340. As described with regard to the chassis 400 of FIG. 4 and the IHS 500 of FIG. 5, embodiments may instrument one or more network controllers to track the networks used by users 305 and devices 315 in requesting access to zero-trust resources 340. Also as described above, a policy enforcement point 320 may collect session information for requests for zero-trust resources 340, where the collected session information may be utilized to identify networks used in requesting access to the zero-trust resource 340.

Using any such available network information in the collected telemetry for the access decision, at 750, embodiments may calculate an updated network tenant trust score based on security characteristics of the networks identified in the collected telemetry as being used to request access to the zero-trust resource 340. If no prior network tenant trust score is available for the zero-trust resource 340, embodiments may begin with a default base score that is then adjusted upwards or downwards based on the collected network information for the access decision that is being evaluated. When a prior network tenant trust score is available, that score may then be adjusted upwards or downwards based on the additional network information in the collected telemetry.

For example, adjustments to the network tenant trust score may be made based on network information such as the number of different networks detected as being used to request access to the zero-trust resource 340 over the recent interval within the collected telemetry. In this example, the network tenant trust score may be adjusted downwards in relation to the number of different networks being used, such that an increase in the number of distinct networks being used to access the zero-trust resource 340 results in a downward adjustment in the network tenant trust score for that resource. Such downwards adjustments may be made in response to certain networks being used to access the resource, such as use of a non-encrypted web session.

In some embodiments, collected network information may be used to identify networks that support, or fail to support, certain security protocols, thus indicating a level of trustworthiness in these network used to access the zero-trust resource 340. In such embodiments, the network tenant trust score may be adjusted upwards based on the use of encrypted networks, such as VPNs, to access the zero-trust resource 340. Conversely, downward adjustments may be made based on the detection of non-encrypted or non-secure network protocols used to request access the zero-trust resource 340. Through such adjustments, the network tenant trust score for a zero-trust resource 340 is updated to reflect the security posture of the resource and/or environment based on the networks recently used to request access to the zero-trust resource 340, resulting in adjustments by the zero-trust environment 300 in evaluating future requests for access this particular zero-trust resource 340.

Updates to tenant trust scores may continue, at 755, with the evaluation of the data that is present in the requested zero-trust resource 340, and that is exposed, at least to some degree, by granting the request. Embodiments may thus identify data that is associated with the zero-trust resource 340. In instances where the zero-trust resource 340 is a data element such as a file, the exposed data may be the same as the requested data. In instances where the zero-trust resource 340 is a software application, such as a database application or vSAN application, the exposed data may include the database tables or other information that is accessed using these data storage applications. Similarly, in instances where the zero-trust resource 340 is a hardware resource, such as a storage sled 405*a* of FIG. 4, the exposed data may include the various data storage applications operating on the sled and the data stored on the various storage devices included in the storage sled.

Using any such available data information in the collected telemetry for the access decision, at 760, embodiments may calculate an updated data tenant trust score based on data exposure due to providing access to the zero-trust resource 340. If no prior data tenant trust score is available for the zero-trust resource 340, embodiments may begin with a default base score that is then adjusted upwards or downwards based on the collected data exposure information for the access decision that is being evaluated. When a prior data tenant trust score is available, that score may then be adjusted upwards or downwards based on the additional data exposure information in the collected telemetry.

For example, adjustments to the data tenant trust score may be made based on the amount of data that is exposed in providing the requested access to the zero-trust resource 340, where the score may be adjusted upwards in relation to the amount of data that is exposed. In another illustrative example, the data trust score may be adjusted downwards based on the type of protected data was not exposed by denying the request, such as the denial of a request that would exposure highly protected health care information. Conversely, upwards adjustments may be made based on the data protections for the exposed data, such as the use of encryption or data redundancy. Upwards adjustments may also be made based on the use of virtualized systems to manage storage of the data. Through such adjustments, the data tenant trust score for a zero-trust resource 340 is updated to reflect the updated security posture of the resource and/or environment.

With all of the tenant trust scores updated based on available data, at 765, embodiments may calculate an aggregated trust score for the zero-trust resource 340. In some embodiments, the aggregated trust score may sum the individual tenant trust scores. In some embodiments, the tenant trust scores may each be weighted prior to their summing, thus emphasizing the relative importance of certain tenant scores when calculating an aggregated trust score for a zero-trust resource 340. In some embodiments, other weights that are applicable to the zero-trust resource may be used to further adjust the trust score. As described in additional detail below, a criticality weight may be assigned to a resource based on classification of the trust score for the resource (e.g., classification of the resource as high-risk, low-risk, etc.). In such instances, such criticality weights may be used to further adjust the risk score for the zero-trust resource. As described, such weights for a zero-trust resource may be selected based on various parameters that may be automatically or manually assigned for use within a trust scoring framework, such as to adapt the framework for operation within a specific environment. Through such weights, the operation of the scoring framework may be adapted to account for specific characteristic of a zero-trust environment, such as environmental characteristics that reflect heightened security requirements and/or higher risks.

Some embodiments may continue, at 770, in classifying the aggregated trust score that has been calculated for the zero-trust resource 340. For instance, based on the distribution of recent trust scores calculated by embodiments, an individual trust score may be classified based on statistical characterizations of the trust score, such as classifying a zero-trust resources 340 as high risk on the basis of a trust score for the zero-trust resource being two deviations above the mean trust score for the zero-trust resources 340 of the zero-trust environment 300. In this same manner, the zero-trust resource 340 may be classified as medium risk based on having an aggregated trust score that is within one deviation of the mean trust for all of the zero-trust resources 340.

In some embodiments, the classification of the trust score for a zero-trust resource may result in the assignment of a weight for the zero-trust resource, where the weight may be selected in order to reflect the criticality or risk level of the resource. For instance, in scenarios where the trust score classification for a resource indicates a high-risk, a criticality weight with a relatively low value (e.g., 0.25) may be selected for the zero-trust resource, where the selected weight reflects the high risk associated with this resource. Through the assignment of a low value weight for a resource that has been classified as high risk, the calculated trust score for this resource may thus be adjusted downward. In a scenario where the trust score classification indicates a low-risk for a resource, a higher criticality weight (e.g., 0.4) may be selected for that resource. The selection of a higher value weight for a low-risk resource thus results in a trust score that may be adjusted downward, but to a lesser degree than for a high-risk resource. As described, such selection of weights for zero-trust resources may be used to adjust particular aspects of the trust scoring framework in accordance with particular security requirements of an environment.

As indicate in FIG. 7, at 775, embodiments may determine whether additional access decisions remain to be evaluated within the batch of decisions that are currently being evaluated. If additional access decisions remain for evaluation, at 710, embodiments may initiate evaluation of another decision to allow or deny requested access to a zero-trust resource 340, which may be the same or different resource from the prior iteration. If no further access decisions remain from the batch, at 780, embodiments may calculate an updated trust score for the zero-trust environment 300. In some embodiments, the trust score for zero-trust environment 300 may be a moving average of the recent trust score updates calculated for zero-trust resources 340. Once the trust score for the zero-trust environment 300 has been updated, embodiments return to FIG. 6 for use of the updated trust score information in determining whether to grant or deny requestors 305 seeking access to a zero-trust resource 340.

Figure 8:
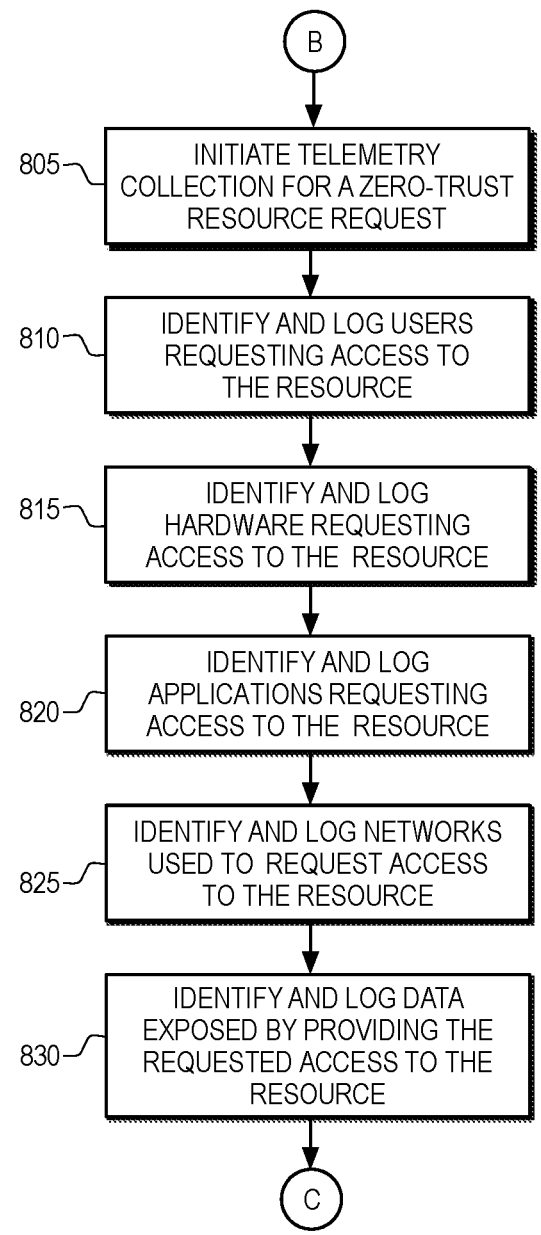
FIG. 8 is a flowchart describing certain steps of an additional process according to various embodiments for collecting telemetry used to determine trust scores used in a trust scoring framework of a zero-trust environment.

FIG. 8 is a flowchart describing certain steps of an additional process 800 according to various embodiments for collecting and logging telemetry used to determine a trust score used in a trust scoring framework of a zero-trust environment. As indicated, embodiments may begin, in transition from FIG. 6, with the collection of telemetry associated with the decision to allow or deny a user 310 or devices 315 with requested access to a zero-trust resource 340. At 805, the collection of telemetry is initiated that will capture policy information that is associated with the request for access to the zero-trust resource 340. As described with regard to the chassis 400 of FIG. 4 and the IHS 500 of FIG. 5, embodiments may be instrumented with various capabilities for collecting telemetry that may be used in characterizing the trust in a zero-trust resource 340.

Accordingly, at 810, telemetry collection embodiments may identify and log the users that are currently accessing the requested zero-trust resource 340. As described, various hardware components of a chassis 400 and/or IHS 500 may be instrumented to collect telemetry that identifies users that are currently accessing a specific zero-trust resource 340. For example, in a scenario where the zero-trust resource 340 being requested is hardware accelerator 550, an IHS 500 may be instrumented to collect information specifying the users that are currently accessing the hardware accelerator 550, where the hardware accelerator itself may be instrumented to collect this user information, or where a management resource, such as a remote access controller 530, may utilize sideband management connections with the hardware accelerator to collect the user identity information that will included in the reported telemetry. In some instances, the collected user information will include the number and type of different users that are currently accessing a zero-trust resource 340. For example, a database application designated as a zero-trust resource 340 may collect information on users that are currently accessing the database and may collect information for classifying the users, such as an administrative user, a trusted regular user or a new user classification.

Some embodiments may continue, at 815, with the collection and logging of telemetry that specifies the hardware components that are accessing the requested zero-trust resource 340. As described with regard to FIGS. 4 and 5, various components of chassis 400 and/or IHS 500 may be instrumented to collect telemetry that identifies hardware devices that are currently accessing a specific zero-trust resource 340. For example, a compute sled 405a of chassis 400 may be instrumented to track the hardware devices that are currently accessing the compute sled. Similarly, a hardware accelerator 550 or GPU 560 of IHS 500 may be instrumented to track the hardware devices that are currently interfacing with these devices.

The collection of telemetry associated with the access decision may continue, at 820, with the collection and logging of telemetry that specifies the software application that access the requested zero-trust resource 340. Various hardware and software resources within a datacenter may be instrumented to track the software applications that are accessing a zero-trust resource 340. For example, operating systems running on compute sleds 405a-n and storage sleds 415a-n may track the applications used to access these sleds of chassis 400. In other instances, a remote access controller 530 may utilize sideband management connections 555 in order to track the applications that are currently accessing managed devices of an IHS 500, such as tracking application that access power management 520 hardware that has been designated as a zero-trust resource 340. As described, instrumented networking components, such as network controllers 540 and PCIe switches 565a-b, may collect session information that can be used to identify the applications, or types of applications, accessing a zero-trust resources, such as by identifying an administrative software application based on detecting a management session using a management network protocol.

At 825, embodiments may continue with the collection and logging of network telemetry data that identifies the networks being used to access a zero-trust resource 340. As described with regard to FIG. 4, a network switch 440 of chassis 400 may be instrumented to collect telemetry that identifies networks that are currently accessing a specific zero-trust resource 340. As described with regard to FIG. 5, a network controller 540 of IHS 500 may be similarly instrumented to collect telemetry that identifies networks that are currently accessing a specific zero-trust resource 340. The collection of telemetry may conclude, at 830, with the collection and logging of the data that is exposed in providing access to a zero-trust resource 340.

With the collection of telemetry for the access decision completed, as indicated in FIG. 8, embodiments return to FIG. 6, where the collected telemetry may be stored for later processing along with a batch of other telemetry collected for other access decisions. In some instances, the availability of computing resources and/or changes within the datacenter may warrant immediate processing of the collected telemetry data. Whether stored for later processing in a batch or whether processed immediately, the collected telemetry data is evaluated according to process 700 of FIG. 7 in order to update trust scores for the zero-trust resource 340 and/or zero-trust environment 300. These updated trust scores are used within policy determinations to make future access decisions, where the updated trust scores more accurately reflect any risks that may be present in accessing a particular zero-trust resource 340.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for evaluating trust in resources of a zero-trust computing environment, the method comprising:
receiving a request from a first user for access to a first resource of the zero-trust computing environment;
calculating a trust score for the first resource, where the trust score is calculated based on: users requesting access to the first resource, hardware components used to request access to the first resource, software applications used to request access to the first resource, networks used to request access to the first resource and data exposed by providing the requested access to the first resource;
calculating an identity tenant trust score for the first resource, wherein the identity tenant trust score is calculated based on users requesting access to the first resource, and wherein the identity tenant trust score for the first resource is adjusted upwards in response to determining that users requesting access to the first resource are limited to only administrative users;
updating the trust score for the first resource, based at least in part on the identity tenant trust score; and
evaluating the request from the first user based on one or more policies of the zero-trust computing environment that govern access to the first resource, where a first policy grants access to the first resource based in part on the calculated trust score of the first resource.

2. The method of claim 1, further comprising:
calculating a trust score of the zero-trust computing environment by summing the trust score of the first resource and a plurality of trust scores calculated for other resources of the zero-trust computing environment, wherein a second policy grants access to the first resource based on the trust score of the zero-trust computing environment.

3. The method of claim 1, further comprising:
calculating a hardware tenant trust score for the first resource, wherein the hardware tenant trust score is calculated based on hardware devices requesting access to the first resource, and wherein the hardware tenant trust score is used to update the trust score for the first resource.

4. The method of claim 3, wherein the hardware tenant trust score for the first resource is adjusted upwards due to the hardware devices requesting access to the first resource comprising only administrative hardware.

5. The method of claim 3, wherein the hardware tenant trust score for the first resource is adjusted downwards due to the hardware device requesting access to the first resource comprising a portable hardware device.

6. The method of claim 1, further comprising:
calculating a software tenant trust score for the first resource, wherein the software tenant trust score is calculated based on software applications requesting access to the first resource, and wherein the software tenant trust score is used to update the trust score for the first resource.

7. The method of claim 6, wherein the software tenant trust score for the first resource is adjusted upwards due to the software applications requesting access to the first resource comprising only administrative software.

8. The method of claim 6, wherein the software tenant trust score for the first resource is adjusted downwards due to the software applications requesting access to the first resource comprising web-based software.

9. The method of claim 1, further comprising:
calculating a network tenant trust score for the first resource, wherein the network tenant trust score is calculated based on networks used to request access to the first resource, and wherein the network tenant trust score is used to update the trust score for the first resource.

10. The method of claim 9, wherein the network tenant trust score for the first resource is adjusted upwards in relation to a number of different networks being used to request access to the first resource.

11. The method of claim 9, wherein the network tenant trust score for the first resource is adjusted downwards due to the networks being used to request access to the first resource utilizing encrypted network communications.

12. The method of claim 1, further comprising:
calculating a data tenant trust score for the first resource, wherein the data tenant trust score is calculated based on data exposed by providing the requested access to the first resource, and wherein the data tenant trust score is used to update the trust score for the first resource.

13. The method of claim 12, wherein the data tenant trust score for the first resource is adjusted upwards based on data that is exposed by granting the requested access to the first resource.

14. The method of claim 1, wherein the first resource of the zero-trust environment comprises at least one of: a hardware component, a software application, or a data element.

15. The method of claim 1, wherein the identity tenant trust score for the first resource is adjusted downwards in relation to a number of denials for access to the first resource.

16. An Information Handling System (IHS) operating in support of a zero-trust computer environment, the IHS comprising:
one or more processors; and
one or more memory devices that comprise instructions stored thereon that, upon execution by the one or more processors, cause the IHS to perform operations that comprise:
receive a request from a first user for access to a first resource of the zero-trust computer environment;

calculate a trust score for the first resource, where the trust score is calculated based on: a request for access to the first resource, hardware components which request access to the first resource, software applications which request access to the first resource, networks which request access to the first resource and data exposed when the requested access to the first resource is provided;

calculate a hardware tenant trust score for the first resource, wherein the hardware tenant trust score is calculated based on hardware devices which request access to the first resource, and wherein the hardware tenant trust score for the first resource is adjusted upwards in response to a determination that the hardware devices which request access to the first resource are limited to only administrative hardware;

update the trust score for the first resource, based at least in part on the hardware tenant trust score; and evaluate the request from the first user based on one or more policies of the zero-trust computer environment that govern access to the first resource, where a first policy is configured to grant access to the first resource based at least in part on the trust score of the first resource.

17. The IHS of claim 16, configured to perform further operations that comprise: calculate a trust score of the zero-trust computer environment based at least in part on a sum of the trust score of the first resource and a plurality of trust scores calculated for other resources of the zero-trust computer environment, wherein a second policy is configured to grant access to the first resource based on the trust score of the zero-trust computer environment.

18. A computer-readable storage device configured to operate within a zero-trust computing computer environment, wherein the computer-readable storage device comprises program instructions stored thereon that, upon execution by one or more processors, cause the one or more processors to perform operations that comprise:

receive a request from a first user for access to a first resource of the zero-trust computer environment;

calculate a trust score for the first resource, where the trust score is calculated based on: a request for access to the first resource, hardware components which request access to the first resource, software applications which request access to the first resource, networks which request access to the first resource and data exposed when the requested access to the first resource is provided;

calculate a software tenant trust score for the first resource, wherein the software tenant trust score is calculated based on software applications which request access to the first resource, and wherein the software tenant trust score for the first resource is adjusted downwards in response to a determination that the software applications which request access to the first resource comprise web-based software;

update, based at least in part on the software tenant trust score, the trust score for the first resource; and evaluate the request from the first user based on one or more policies of the zero-trust computer environment that govern access to the first resource, where a first policy is configured to grant access to the first resource based at least in part on the trust score of the first resource.

* * * * *